United States Patent
Pisoni

(10) Patent No.: US 10,210,432 B2
(45) Date of Patent: *Feb. 19, 2019

(54) IMAGE OBJECT RECOGNITION

(71) Applicant: Accenture Global Solutions Limited, Dublin (IE)

(72) Inventor: Andrea Pisoni, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/007,629

(22) Filed: Jun. 13, 2018

(65) Prior Publication Data

US 2019/0005358 A1      Jan. 3, 2019

Related U.S. Application Data

(63) Continuation of application No. 15/692,180, filed on Aug. 31, 2017, now Pat. No. 10,019,654.

(60) Provisional application No. 62/526,082, filed on Jun. 28, 2017.

(51) Int. Cl.
   *G06K 9/00* (2006.01)
   *G06K 9/62* (2006.01)
   *G06N 3/08* (2006.01)

(52) U.S. Cl.
   CPC ......... *G06K 9/6267* (2013.01); *G06K 9/6256* (2013.01); *G06N 3/08* (2013.01)

(58) Field of Classification Search
   CPC ....... G06K 9/6267; G06K 9/6256; G06N 3/08
   See application file for complete search history.

(56) References Cited

U.S. PATENT DOCUMENTS

| 9,373,057 | B1 | 6/2016 | Erhan et al. |
| 9,589,374 | B1* | 3/2017 | Gao ............... G06T 11/008 |
| 10,032,072 | B1* | 7/2018 | Tran ............... G06K 9/00442 |
| 2008/0062262 | A1 | 3/2008 | Perron et al. |
| 2015/0371149 | A1 | 12/2015 | Iso |

(Continued)

OTHER PUBLICATIONS

Office Action issued in Australian Application No. 2018202174, dated Jun. 1, 2018, 5 pages.

(Continued)

*Primary Examiner* — Shefali D Goradia
(74) *Attorney, Agent, or Firm* — Fish & Richardson P.C.

(57) ABSTRACT

Methods, systems, and apparatus, including computer programs encoded on computer storage media, for recognizing object sub-types in images. One of the methods includes receiving training data; selecting training data for an image; determining whether to randomly permute a value of a property of the selected image; providing, to a deep neural network, the particular training data or the randomly permuted particular training data; receiving, from the deep neural network, output data indicating a predicted label for an object sub-type for an object depicted in the selected image, and a confidence score that represents a likelihood that the object has the object sub-type; updating one or more weights in the deep neural network using an expected output value, the predicted label, and the confidence score; and providing the deep neural network to a mobile device for use detecting whether one or more images depict objects having the particular object sub-type.

29 Claims, 7 Drawing Sheets

(56) References Cited

U.S. PATENT DOCUMENTS

| | | |
|---|---|---|
| 2016/0174902 A1 | 6/2016 | Goergescu et al. |
| 2017/0011281 A1 | 1/2017 | Dijkman et al. |
| 2017/0061249 A1 | 3/2017 | Estrada et al. |
| 2017/0098138 A1 | 4/2017 | Wang et al. |
| 2017/0109615 A1 | 4/2017 | Yatziv et al. |

OTHER PUBLICATIONS

Forrest N. Iandola et al., "Squeezenet: Alexnet-Level Accuracy With 50x Fewer Parameters and <0.5mb Model Size", arXiv:1602.07360v4, Nov. 4, 2016, 13 pages.

K-means clustering—Wikipedia, retrieved from <https://en.wikipedia.org/wiki/K-means_clustering>, Jul. 21, 2017, 13 pages.

Bichen Wu et al., "SqueezeDet: Unified, Small, Low Power Fully Convolutional Neural Networks for Real-Time Object Detection for Autonomous Driving", arXiv:1612.01051v2, Dec. 22, 2016, 12 pages.

Sergey Ioffe et al., "Batch Normalization: Accelerating Deep Network Training by Reducing Internal Covariate Shift", arXiv:1502.03167v3, Mar. 2, 2015, 11 pages.

Sklearn.cluster.KMeans: K-Means clustering—scikit learn, retrieved from <http://scikit-learn.org/stable/modules/generated/sklearn.cluster.KMeans.html>, Jul. 2017, 7 pages.

Gideon Lewis-Kraus,"The Great A.I. Awakening", The New York Times, Dec. 14, 2016, 49 pages.

Wei Liu et al., "SSD: Single Shot MultiBox Detector", arXiv:1512.02325v5, Dec. 29, 2016, 17 pages.

Sklearn.cluster.KMeans: K-Means clustering—scikit-learn 0.18.2 documentation, retrieved from <http://scikit-learn.org/stable/modules/generated/sklearn.cluster.KMeans.html>, Jul. 2017, 9 pages.

Aloysius et al, "A review on deep convolutional neural networks," presented at 2017 International Conference on Communication and Signal Processing (ICCSP), Apr. 6, 2019, 5 pages.

Al-Saffar et al, "Review of deep convolutional neural network in image classification," presented at 2017 International Conference on Radar, Antenna, Microwave, Electronics, and Telecommunications (ICRAMET), Oct. 23, 2017, 6 pages.

European International Search Report and Written Opinion in International Application No. 18161094.0, dated Sep. 6, 2018, 13 pages.

Lin et al, "Sensitive information detection on cyber-space," presented at Medical image computing and computer-assisted intervention 18th international conference, Oct. 5-9, 2015, 9 pages.

Sharma et al, "Era of deep neural networks: a review," presented at 2017 8th International Conference on Computing, Communication and Networking Technologies (ICCCNT), Jul. 3, 2017, 4 pages.

Zhiqiang et al, "A review of object detection based on convolutional neural network," presented at 2017 36th Chinese Control Conference (CCC), Jul. 26, 2017, 6 pages.

\* cited by examiner

IMAGE OBJECT RECOGNITION

CROSS-REFERENCE TO RELATED APPLICATION

This application is a continuation of U.S. patent application Ser. No. 15/692,180, filed Aug. 31, 2017, which claims the benefit of U.S. Provisional Application No. 62/526,082, filed on Jun. 28, 2017, the contents of which are incorporated by reference herein.

BACKGROUND

Some mobile devices include integrated cameras. These mobile devices allow a user to capture images using the integrated cameras. For instance, the mobile device may allow a user to capture an image of a landscape or a city street.

Some image analysis systems, e.g., executing on a server, may perform object recognition on an image to detect objects depicted in the image. For example, an image analysis system may determine whether an object depicted in an image is a person, a tree, or a dog.

SUMMARY

A mobile device may recognize specific objects depicted in an image such as a particular type of soda bottle, a particular type of bottled water, or a particular type of tree. The mobile device uses a deep neural network, potentially without requesting data from another computer, to analyze the image and determine the specific objects depicted in the image. For instance, the mobile device may determine whether a particular soda bottle depicted in the image is a bottle of Coca-Cola or Coca-Cola Light. In another example, the mobile device may determine whether a particular tree depicted in the image is an *acer pseudoplatanus* (i.e., a sycamore maple) or an *acer platanoides* (i.e., a Norway maple).

The mobile device may use a deep neural network that is trained using random transformations of an input data set, e.g., to make the deep neural network more robust for images captured in different environments. For example, a training system may use three hundred to five hundred training images that depict the particular types of objects for which the deep neural network will be trained. The training system can use supervised learning with random transformations of the training images to train the deep neural network. The random transformations may include changes to the light in the image, a jitter of light or an object depicted in the image, a color in the image, an orientation of the image, a size of an object depicted in the image, or a combination of two or more of these. The training system may change the lighting by adjusting an amount of ambient light depicted in an image, e.g., from a sunny to a cloudy day or based on another amount of light. The training system may change a color of an object such as the darkness of leaves, a depth or shade of red on a soda bottle, e.g., caused by the soda bottle being in a shadow, or another color included in an image. The training system may change an orientation of an object by rotating an image, e.g., five or ten degrees. The training system may adjust a size of an object depicted in an image by cropping the image to decrease the ratio between the size of the object and the total content depicted in the image. The training system may add additional content to an image to increase the ratio between the size of the object and the total content depicted in the image.

The mobile device may use the deep neural network to determine a name of the particular type of object, to determine a location of the particular type of object in an image, or both. For instance, the mobile device may receive the additional information from the deep neural network and provide additional information for presentation. The additional information may indicate the particular type of a depicted object, such as the name of the object sub-type, other information about the particular type of the depicted object, e.g., product information, or both. In some examples, the mobile device may provide data about the particular type of object, the location of the particular type of object, or both, to a server. The server may use the data to determine inventory information, inventory compliance information, e.g., for object placement, or both.

In some examples, the mobile device determines the particular type of object without using a bar code. For instance, the mobile device does not need to capture an image that includes a bar code on an object to determine the object sub-type using the deep neural network.

In general, one innovative aspect of the subject matter described in this specification can be embodied in methods that include the actions of receiving training data representing a plurality of images at a deep neural network training system, the plurality of images depicting objects having an object sub-type, and the deep neural network training system to train a deep neural network to recognize the object sub-type for one of the objects depicted in the plurality of images, wherein multiple object sub-types for which corresponding objects are depicted in the plurality of images each correspond to the same object type; for a plurality of iterations: selecting particular training data for an image from the plurality of images; determining whether to randomly permute a value of a property of the selected image that is represented by the particular training data; providing, to the deep neural network, the particular training data for the selected image or the randomly permuted particular training data for the selected image; receiving, from the deep neural network, output data indicating: a predicted label for a particular object sub-type for an object depicted in the selected image, and a confidence score that represents a likelihood that the object depicted in the selected image has the particular object sub-type; and updating one or more weights in the deep neural network using: an expected output value that indicates an actual object sub-type label for the object depicted in the selected image, the predicted label for the particular object sub-type, and the confidence score that represents the likelihood that the object depicted in the selected image has the particular object sub-type; and providing the deep neural network to a mobile device for use detecting whether one or more images depict objects having the particular object sub-type. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving training data representing a plurality of images, the plurality of images depicting objects having an object sub-type, and the deep neural network training system training a deep neural network to recognize the object sub-type for one of the objects depicted in the plurality of images, wherein multiple object sub-types for which corresponding objects are depicted in the plurality of images each correspond to the same object type; for a plurality of iterations: selecting particular training data for an image from the plurality of images; determining whether to randomly permute a property of the selected image that is represented by the particular training data; providing, to the deep neural network, the particular training data for the selected image or the randomly permuted particular training data for the selected image; receiving, from the deep neural network, output data indicating: a predicted label for a particular object sub-type for an object depicted in the selected image, location information defining a region of the selected image in which the object is likely depicted, and a confidence score that represents a likelihood that the object exists in the region of the selected image defined by the location information; and updating one or more weights in the deep neural network using: an expected output value that indicates an actual object sub-type label for the object depicted in the selected image, the predicted label for the particular object sub-type, and the confidence score that represents the likelihood that the object depicted in the selected image has the particular object sub-type; and providing the deep neural network to a mobile device for use detecting whether one or more images depict objects having the particular object sub-type. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving data for an image that depicts a plurality of objects; providing, to a deep neural network, the data to cause the deep neural network to predict object sub-type labels for each of the plurality of objects; receiving, from the deep neural network for some of the objects in the plurality of objects, output data that represents a sub-type label that indicates a likely object sub-type for the object, and an object location that indicates a location of the object in the image; and generating, using the output data for some of the objects in the plurality of objects, a representation of the image that indicates, for some of the objects in the plurality of objects, a location of the object in the image and the sub-type label that indicates the likely object sub-type for the object. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Updating the one or more weights in the deep neural network may include updating the one or more weights in the deep neural network using, for each of two or more images from the plurality of images, a respective expected output value, the respective predicted label for the particular object sub-type, and the respective confidence score. Receiving, from the deep neural network, output data indicating the predicted label for the particular object sub-type for the object depicted in the selected image and the confidence score that represents the likelihood that the object depicted in the selected image has the particular object sub-type may include receiving, from the deep neural network, the output data that indicates a predicted location of the object in the selected image. Updating the one or more weights in the deep neural network may include updating the one or more weights in the deep neural network using the expected output value, the predicted label for the particular object sub-type, the respective confidence score, an actual location of the object in the selected image, and the predicted location of the object in the selected image. Determining whether to randomly permute a value of a property of the selected image that is represented by the particular training data may include determining whether to randomly perform one or more of the following: crop a portion of the selected image; adjust a zoom level for at least a portion of the selected image; adjust a stretch value for at least a portion of the selected image; transpose the selected image over an axis; adjust at least one color depicted in the selected image; adjust an alpha jitter for at least a portion of the selected image; adjust a shear distortion for at least a portion of the selected image; or adjust a homography for at least a portion of the selected image.

In some implementations, each iteration may include selecting two or more images from the quantity of images. Determining whether to randomly permute a value of a property of the selected image that is represented by the particular training data may include: selecting, for each iteration, one or more particular images from the selected two or more images; and determining, for each of the one or more particular images, a property to randomly permute. The confidence score may be an object confidence score, or a label confidence score. Receiving, from the deep neural network, output data indicating the predicted label for the particular object sub-type for the object depicted in the selected image and the confidence score that represents the likelihood that the object exists in the region of the selected image defined by the location information may include receiving, from the deep neural network, the output data that indicates a label confidence score that represents a likelihood that the object depicted in the selected image has the particular object sub-type. Updating the one or more weights in the deep neural network may include updating the one or more weights in the deep neural network using the expected output value, the predicted label for the particular object sub-type, the respective label confidence score, the respective object confidence score, an actual location of the object in the selected image, and the location information defining a region of the selected image in which the object is likely depicted.

In some implementations, the method may include determining whether to create multiple overlapping portions of data for the image that each include a proper subset of data for the image; and in response to determining to create the multiple overlapping portions of data for the image, creating the multiple overlapping portions of data for the image. Providing, to a deep neural network, the data to cause the deep neural network to predict object sub-type labels for each of the plurality of objects may include providing, to the deep neural network, data for each of the multiple overlapping portions separately. The method may include receiving, for some of the objects in the plurality of objects, a corresponding confidence score that indicates a likelihood that the object is of the object sub-type. Determining whether to create multiple overlapping portions of data for the image that each include a proper subset of data for the image may include determining, for each of the confidence scores, whether the corresponding confidence score satisfies a threshold confidence score. Creating the multiple overlapping portions of data for the image may be responsive to determining that at least one of the confidence scores does not satisfy the threshold confidence score. Determining whether to create multiple overlapping portions of data for the image that each include a proper subset of data for the image may include determining whether a current processing duration satisfies a threshold processing duration. Creating the multiple overlapping portions of data for the image may be responsive to determining that the current processing duration satisfies the threshold processing duration.

In some implementations, the method may include receiving, for some of the objects in the plurality of objects, a corresponding confidence score that indicates a likelihood that the object is of a corresponding object sub-type; and determining, for at least some of the objects using the corresponding confidence scores, whether to use a disambiguation deep neural network, different from the deep neural network, to determine an object sub-type label for the object. Receiving, for some of the objects in the plurality of objects, a corresponding confidence score that indicates a likelihood that the object is of a corresponding object sub-type may include receiving, for some of the objects in the plurality of objects, multiple corresponding confidence scores each of which indicates a likelihood that the object is of an object sub-type for which the deep neural network is trained. Determining, for at least some of the objects using the corresponding confidence scores, whether to use a disambiguation deep neural network, different from the deep neural network, to determine an object sub-type label for the object may include determining, for at least some of the objects, whether two of the corresponding confidence scores each satisfy a threshold confidence score. Receiving, for some of the objects in the plurality of objects, a corresponding confidence score that indicates a likelihood that the object is of a corresponding object sub-type may include receiving, for some of the objects in the plurality of objects, multiple corresponding confidence scores each of which indicates a likelihood that the object is of an object sub-type for which the deep neural network is trained. Determining, for at least some of the objects using the corresponding confidence scores, whether to use a disambiguation deep neural network, different from the deep neural network, to determine an object sub-type label for the object may include determining, for at least some of the objects, whether two of the corresponding confidence scores are within a threshold distance from each other.

In some implementations, receiving, from the deep neural network for some of the objects in the plurality of objects, the output data that represents the sub-type label that indicates a likely object sub-type for the object, and the object location that indicates a location of the object in the image may include receiving, for some of the objects in the plurality of objects, a corresponding confidence score that indicates a likelihood that the object is of the object sub-type. Generating, using the output data for some of the objects in the plurality of objects, the representation of the image that indicates, for some of the objects in the plurality of objects, the location of the object in the image and the sub-type label that indicates the likely object sub-type for the object may include: determining that at least one of the confidence scores does not satisfy a threshold confidence score; determining that a current processing time exceeds a threshold processing time; and in response to determining that a current processing time exceeds a threshold processing time, determining to generate the representation of the image despite determining that at least one of the confidence scores does not satisfy a threshold confidence score.

In some implementations, the method may include determining, using the representation of the image, a stock of one or more objects from the plurality of objects; and determining, using the stock of the one or more objects, a quantity of objects to request for delivery to a physical location that includes an area depicted in the image. Receiving the data for the image that depicts the plurality of objects may include: receiving, for each of two or more images, first data for the respective image; determining, using the first data for each of the two or more images, that the two or more images depict the same physical content; and in response to determining that the two or more images depict the same physical content determining, using the first data for each of the two or more images, the data for the image that depicts the plurality of objects by stitching together the two or more images.

The subject matter described in this specification can be implemented in various embodiments and may result in one or more of the following advantages. In some implementations, training a machine learning system using random transformations of image property values may make the machine learning system more robust, e.g., allowing the machine learning system to more accurately identify objects in different environments. In some implementations, the machine learning system described in this document has low computation requirements compared to other systems. For instance, use of a deep neural network allows the machine learning system to use fewer processor cycles, less memory, or both, to determine a particular object depicted in an image. In some implementations, use of the deep neural network described in this document by a device may reduce computation time, e.g., by eliminating a need to request object analysis from a server. For example, a device may use the deep neural network to determine an object sub-type in seconds or less, e.g., a half a second, rather than waiting minutes, e.g., five to ten minutes, for a result from a server. A device using the systems and methods described below may capture multiple images and determine object sub-type labels for objects depicted in each of the images without dependence upon a) network bandwidth, b) number of active requests on a server, c) number of object sub-types that can be identified by the system, or d) a combination of two or more of these.

In some examples, use of the deep neural network may require less power, reduce or eliminate network bandwidth usage, reduce or eliminate communication between multiple devices, e.g., a user device and a server, or a combination of two or more of these, compared to other techniques. For example, when the deep neural network is run on a mobile device, the power savings offered by embodiments of the invention can allow the device to operate for a longer period of time as compared to device operation when running conventional processing techniques, e.g., which may need to communicate with a server. In some implementations, the systems and methods described below may increase security, privacy, or both, e.g., by not sending data captured by a device to a server for analysis. For instance, the systems and methods described below may process image data only using a user device which may eliminate a need to send sensitive image data to a server, may increase security for the image data, or both. In some implementations, the systems and methods described below may provide better analysis of objects with different orientations, represented in multiple overlapping images, or both, compared to other systems. In some implementations, the systems and methods described below use feature extraction techniques to detect adjacent images, overlapping images, e.g., that depict some of the same content, or both, to increase an accuracy of object sub-type labels for objects depicted in multiple images, to reduce a likelihood that an object is identified multiple times, e.g., once for each image, or both, compared to other systems.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
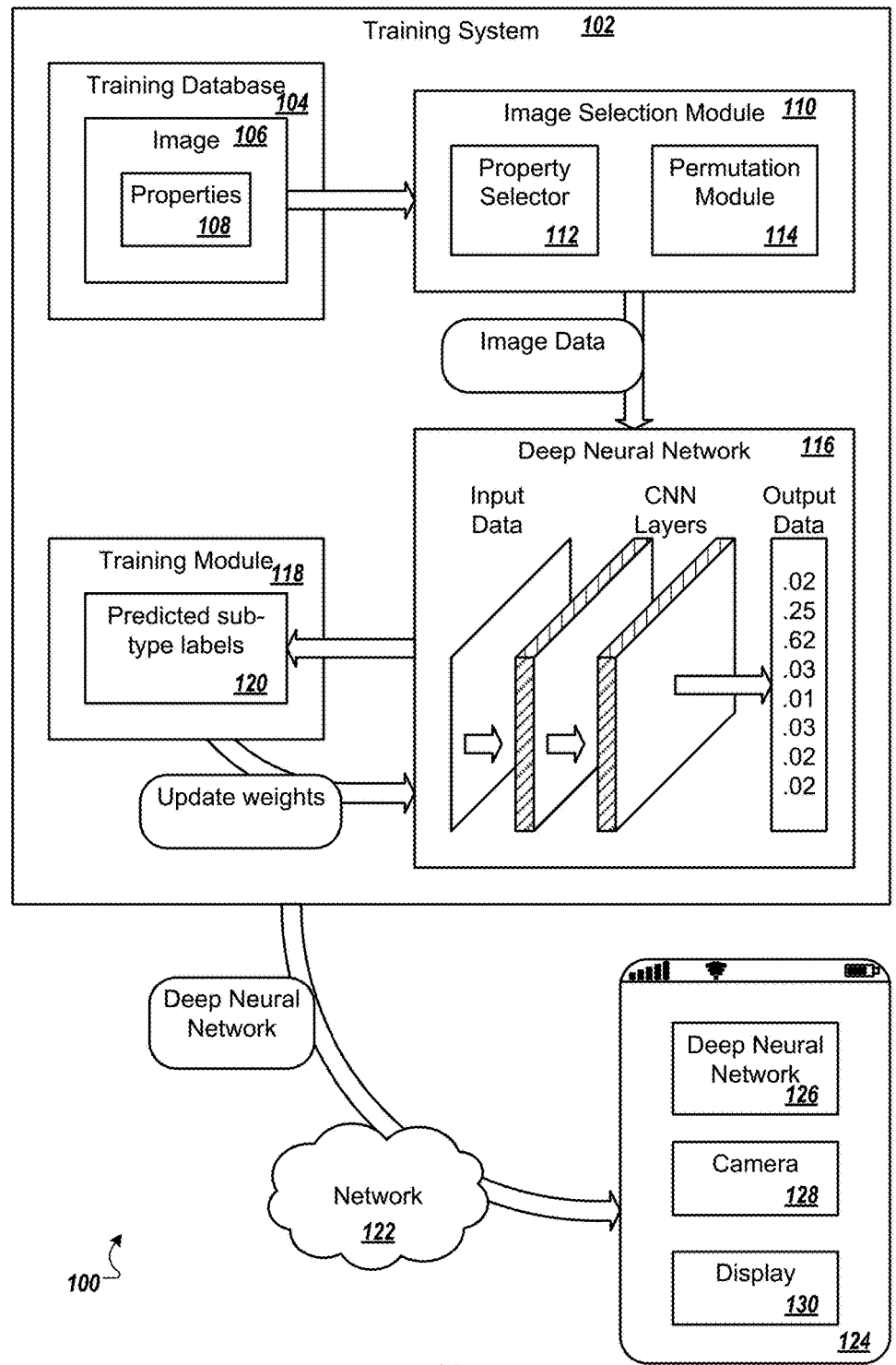
FIG. 1 is an example of an environment for training a neural network to predict sub-type labels for objects depicted in an image.

FIG. 1 is an example of an environment 100 for training a neural network to predict sub-type labels for objects depicted in an image. For instance, the environment 100 includes a training system 102 with a training database 104 of one or more images 106. Each of the images 106 has multiple properties 108 and corresponding property values, and may depict zero, one, or more objects. Some examples of the properties 108 of the images 106 may include color, lighting, orientation, size, etc. Data for the properties 108 can include corresponding property values, which identify a particular color or size, associated with images 106.

At least some of the objects depicted in the images 106 is of a sub-type for which a training system 102 will train a deep neural network 116. The deep neural network 116 may have an output label, potentially in addition to other output values, for each of the sub-types for which the training system 102 trains the deep neural network 116. As described in this document, an output label determined by the deep neural network 116 may indicate a particular sub-type name, a confidence score for a corresponding sub-type name, both, or another appropriate type of data for a sub-type name.

The object sub-types, within a type category, have similar features, e.g., shapes. For instance, an object type may be maple, birch, or soda, to name a few examples. The deep neural network 116 is trained to label objects as sub-types for one particular type. Example sub-types for an object type of maple may include sycamore maple, Norway maple, Persian maple, or silver maple. Example sub-types for birch may include yellow birch, mountain paper birch, dwarf birch, or Japanese cherry birch. Example sub-types for soda may include Coca-Cola Light, Coca-Cola Cherry, Caffeine-Free Coca-Cola, and Coca-Cola Classic.

Some of the images 106 may include negative training examples, in addition to or instead of the objects of the sub-type for which the deep neural network 116 is trained. The deep neural network 116 may have an output category for the negative training examples as "unknown" or another appropriate value. When the training system 102 trains the deep neural network 116 to detect different types of maple trees, one example of a negative training example may include an image of a birch tree. When the training system 102 trains the deep neural network 116 to detect different types of Coke products, one example of a negative training example may include an image of a beverage made by another producer.

An image selection module 110, included in the training system 102, selects images from the training database 104 to use to train the deep neural network 116. The image selection module 110 may determine whether to randomly permute values for one or more properties of an image for a training process. For instance, the image selection module 110 may use any appropriate algorithm to randomly determine whether to permute a value of a property of an image. Upon determining to randomly permute a value of a property, a property selector 112 may determine a property for which the training system 102 will randomly permute a corresponding value. In some examples, the property selector 112 determines both whether to randomly permute a value of a property for an image and for which property or properties to permute corresponding values, e.g., concurrently. For instance, the property selector 112 may generate a random number. When the random number is zero, the property selector 112 may determine to not randomly permute a value of a property for the image. When the random number is not zero, e.g., and is a value between zero and one, the property selector 112 determines a property that corresponds to the random number. The property selector 112 can then randomly permute a value for the determined property.

A permutation module 114 receives data from the property selector 112, both of which may be included in the image selection module 110, that identifies the one or more properties for permutation. The permutation module 114 determines, for each of the identified one or more properties, a random permutation of a value for the property. The value for the property may be for an entire image, a specific portion of an image, or another part of an image. For instance, when the property is an amount of light in an image, the permutation module 114 may randomly determine whether to increase or decrease a value that represents the light in the image or the light in a portion of the image. When the property is an orientation, the permutation module 114 may randomly determine a rotation angle for the content depicted in the image and rotate the image by an amount identified by the rotation angle around a z axis. The z axis may be centered on a center of the image. In some examples, the permutation module 114 may randomly determine a location in the image for the center of the z axis around which to rotate the content depicted in the image.

When the property is a size, the permutation module 114 may randomly determine a change in size value for a particular object depicted in the image, a change in size value for multiple objects depicted in the image, or a change in size value for the entire image. For instance, the permutation module 114 may determine a scale value that increases or decreases the entire size of the image, or only one or more objects depicted in the image, and adjust corresponding content accordingly using the scale value.

When the property is a color in the image, the permutation module 114 may determine how to change a value representing a color for the image. For example, the property selector 112 may select a value for a particular color in the image or only determine that one of the colors in the image should be randomly permuted. When the permutation module 114 receives data identifying a value for a particular color, the permutation module 114 may randomly determine an adjustment for the value of the color. The adjustment to value of the color may be a change to a colorfulness, a chroma, a saturation, hue, shade, or tint, to name a few examples. When the permutation module 114 receives data indicating that a color should be randomly permuted, the permutation module 114 may determine whether to randomly permute all colors depicted in an image, a proper subset of the colors depicted in an image, e.g., some but not all of the colors, one color depicted in the image, e.g., all occurrences of that color, a single occurrence of a color, or a color depicted in a particular area of an image.

When the property is a jitter in an image, the permutation module 114 may determine how to change one or more values representing jitter in the image. For instance, the training system 102 may determine to adjust a value for an intensity of a jitter phase, a value for a frequency of a jitter phase, a value for a single jitter phase in the image, values for multiple jitter phases, or a combination of two or more of these. In some examples, the training system 102 may have multiple hyper-parameters for a jitter parameter, e.g., one for frequency and one for intensity. Values for these hyper-parameters may be numbers between zero and one, inclusive, i.e., in the interval [0,1]. The training system 102, e.g., the permutation module 114, may generate a random number in [0,1] for each jitter phase. Some examples of jitter phases may include color jitter, jitter hue, jitter luminosity, vertical flip, random cropping, random zooming, random scaling, other jitter phases, or a combination of two or more of these. The training system 102 may generate a random number for each jitter phase for a particular training image to generate different random jitter combinations for different images used during training, e.g., for each training step.

The training system 102 uses the random number to adjust the jitter phase. For example, when the random number represents a value for a random zooming, a value of one may indicate no zoom and a value of zero may indicate a maximum zoom value for an image, e.g., a maximum increase in size of an object or all objects depicted in an image. When the random number represents a value for a random scaling, a value of one may indicate no scaling while a value of zero may indicate a maximum decrease in size for an image, e.g., a maximum decrease in size of an object or all objects depicted in an image.

The training system 102 may determine a random permutation for a jitter phase for a portion of an image, e.g., that does not include the entire image, an entire image, or both, e.g., when determining multiple different random permutations for different jitter phases. For instance, the training system 102 may determine a jitter mask to apply to one or more pixels in an image. The jitter mask allows the training system 102 to determine random permutations of jitter values for a subset of the pixels in an image separately from the pixels in another subset of the image. The jitter mask may allow the training system to change every pixel in the image slightly differently. For example, the use of a jitter mask may allow the training system 102 to shift the colors in an image and change the relative color distance, luminosity distance, or both, between neighboring pixels.

In some implementations, the hyper-parameters for jitter are predetermined, e.g., the hyper-parameters may be fixed, determined a priori, or both. The hyper-parameters may be predetermined given the object sub-types, e.g., the training dataset. For example, when the training system 102 is training the deep neural network 116 to identify object sub-types that are often small when depicted in an image, the hyper-parameters likely would not include a zoom out option, e.g., as the small objects might be more difficult for the deep neural network 116 to detect after zooming out.

The training system 102 may use any appropriate process to determine whether to randomly permute a value for a property of an image. For instance, a single component of the training system 102 may determine whether to randomly permute a value for a property, what property value to permute, and how to permute a value for that property.

The image selection module 110, or another module in the training system 102, determines image data that represents a selected image to provide to the deep neural network 116 as input. The image data that represents the selected image includes data for any permuted values of the properties 108 of the image, e.g., for any permutations to an image performed by the permutation module 114. The image data may be any appropriate type of data that represents the image. In some implementations, the image data may be a vector that represents a portion of the image. The portion of the image may be a row, column, or another rectangular area of the image, e.g., a square. In some implementations, the image data may be a matrix that represents a portion or all of the selected image. For instance, the image selection module 110 may select a grid of pixels from the image, determine a matrix that represents the grid of pixels, and provide the matrix as input to the deep neural network 116.

The deep neural network 116 receives the image data and determines, for the objects depicted in the image, at least a predicted sub-type label for the objects for which the deep neural network 116 is trained. The predicted sub-type label indicates a label for the object that has at least a threshold likelihood of being the name of the object. For instance, when the training system 102 trains the deep neural network 116 to determine labels for different maple tree sub-types, the deep neural network 116 may determine that a particular image depicts two sycamore maples, a Norway maple, and one or more objects for which the deep neural network 116 is not being trained. The deep neural network 116 may determine a generic label for each of the objects for which the deep neural network 116 is not being trained, e.g., a label that indicates that the objects are unknown.

The deep neural network 116 may include one or more convolutional neural network (CNN) layers, one or more convolutional filters, or both. For instance, a first convolutional layer in the deep neural network may receive the image data as input. The first convolutional layer may process the image data and generate output. The first convolutional layer may provide the generated output to a second convolutional layer that uses the generated output as input data.

The deep neural network 116 may determine, for at least some of the objects depicted in an image, a confidence score that indicates a likelihood that the object has a corresponding sub-type label. In some examples, the deep neural network 116 may receive data, e.g., during the training process, that identifies data for one or more anchor boxes. The deep neural network 116 may use the data for the anchor boxes as parameters during image analysis, e.g., when determining the predicted sub-type labels. In some examples, the deep neural network 116 may receive the data for the anchor boxes from a k-means module. The k-means module may use a k-means algorithm with data for the training set as input data to determine the anchor boxes. The anchor boxes can be different sizes, different shapes, or both. In some implementations, the anchor boxes are rectangular. In some implementations, the k-means module may select nine anchor boxes and provide data to the deep neural network 116 for the nine anchor boxes. The data for the anchor boxes may be location data that identifies a respective box in an image. The location data may be x-y coordinates, pairs of x-y coordinates, x-y coordinates with a width and a height, or other appropriate location data. The deep neural network 116 may receive the anchor box data before training using data for the images 106. The deep neural network 116 may receive only a single set of anchor box data for a training process, e.g., and use the same anchor box data throughout training and during runtime.

In some implementations, the deep neural network 116 may be a detector. For instance, the deep neural network 116 may output multiple values, each of which is associated with a corresponding location in an image. A set of values may include one or more of: location information, a predicted sub-type label, or one or more. The confidence score may indicate a likelihood that an object exists in a corresponding region of the image identified by corresponding location information. In some examples, a confidence score may indicate a likelihood that an object in the region has the corresponding predicted sub-type label. In some implementations, a set of output values for a particular region in an image may include location information, a predicted sub-type label, an object confidence score, e.g., that indicates a likelihood an object exists at the particular region, and a label confidence score, e.g., that indicates a likelihood that the object is of the sub-type identified by the predicted sub-type label.

In some implementations, the deep neural network 116 may output, for the objects, a respective confidence score for each of the object sub-types for which the deep neural network 116 is trained, a confidence score for an unknown object sub-type, or both. For instance, when the deep neural network 116 is trained to identify objects of nine different object sub-types, the deep neural network 116 may output, for an object depicted in an image, a vector with ten values, one of which corresponds to each of the nine different object sub-types and one of which corresponds to an unknown object sub-type label.

When one of the confidence scores satisfies a threshold confidence score, the training system 102 may determine that the respective predicted object sub-type label for the confidence score applies to the corresponding object. When none of the confidence scores satisfies a threshold confidence score, the training system 102 may determine that multiple objects may be represented by corresponding image data, or that the deep neural network 116 is otherwise unable to detect an object of a sub-type for which the deep neural network 116 is trained as corresponding to the bounding box.

The training system 102 may discard output data for regions for which a corresponding confidence score, e.g., an object confidence score, does not satisfy a threshold confidence score. For example, the training system 102 may discard output data for regions that have a confidence score below fifty percent.

The deep neural network 116 may provide the training system 102 output data for multiple regions in an image. The training system 102 may determine whether any of the regions defined by the output data overlap. When some of the regions defined by the output data overlap, the training system may prune some of the output data, e.g., using non-maximum suppression. For example, after discarding output data for regions for which the corresponding confidence score does not satisfy a threshold confidence score, the training system 102 may perform an iterative process for the output data beginning with output data with a lowest confidence score or a highest confidence score. The training system 102 may compare the location information for a set of output data with other location information for the other output data to determine whether a region defined by the location information overlaps another region defined by the other location information. When the training system 102 determines that the regions overlap, the training system 102 may identify the output data for the region with the lower confidence score as marked for removal. When the training system 102 marks a region for removal, the training system 102 determines whether any other regions that were marked for removal should continue to be marked for removal. For instance, the training system 102 determines whether any output data previously marked for removal only define a region that only overlaps with a current region marked, defined by current output data, for removal or also overlap with another region, defined by other output data. When the output data previously marked for removal defines a region that only overlaps with a current region the training system 102 just determined to mark for removal, the training system 102 updates the output data to not include a marked for removal label. When the output data previously marked for removal defines a region that overlaps with multiple other regions defined by other output data, at least one set of which is not marked for removal, the training system 102 maintains the marked for removal label for the output data.

After analyzing all of the output data as part of the removal labelling process, the training system 102 removes all output data that was marked for removal. The training system 102 uses the output data that was not removed as the final output for the deep neural network 116, e.g., as the predicted sub-type labels 120.

A training module 118, included in the training system 102, receives the predicted sub-type labels 120, the confidence scores, or both, from the deep neural network 116 and updates weights included in the deep neural network 116 using an accuracy of the predicted sub-type labels 120. For instance, the training module 118 determines whether the predicted sub-type label for an object depicted in an image correctly indicates the sub-type of the object, e.g., the name of the sub-type, and uses a result of that determination to update the weights of the deep neural network 116. The training module 118 may use any appropriate process to update the weights in the deep neural network 116. For instance, the training module 118 may use supervised learning to update the weights in the deep neural network 116.

In some implementations, the training module 118 may update weights in the deep neural network 116 using batches of images. For instance, the training module 118 may receive output from the deep neural network 116 for two or more images, e.g., for twenty images. The training module 118 determines updates for weights in the deep neural network 116 using the output for the two or more images. The training module uses the updates to adjust the respective weights in the deep neural network 116.

When the training system 102 completes training for the deep neural network 116, the training system 102 may provide the deep neural network 116, or data representing the deep neural network 116, to a device 124. The device 124 may use the deep neural network 116 to determine predicted sub-type labels for objects depicted in images, as described in more detail with references to FIGS. 2 and 3A-B below. The device 124 may store the deep neural network 116, as the deep neural network 126, in a memory.

The device 124 may include a camera 128 configured to capture images. An image may depict multiple objects, e.g., at least one of which is of the sub-type for which the deep neural network 126 was trained. The device 124 may provide the image, or data for the image, to the deep neural network 126 to cause the deep neural network to generate, for each of at least some of the objects depicted in the image, a predicted sub-type label for the respective object. For instance, when the image includes a hill with multiple trees, the deep neural network 126 may generate a predicted sub-type label for the trees and skip generation of a predicted sub-type label for the hill. When the image includes a cooler with multiple bottled beverages, the deep neural network 126 may generate a predicted sub-type label for the beverages depicted in the image and skip generation of a predicted sub-type label for the cooler. As part of the process to determine the predicted sub-type labels, the deep neural network 126 may determine, for each of the predicted sub-type labels, a confidence score that indicates a likelihood that the corresponding object has the predicted sub-type label. For instance, the deep neural network 126 may generate the confidences scores and the device 124 may use the confidence scores to determine a corresponding predicted sub-type label.

The deep neural network 126, as the trained deep neural network 116, might skip generation of predicted sub-type labels for objects that have less than a threshold amount of content depicted in an image. For example, when an image depicts less than the threshold amount of an object, e.g., only a branch of a tree or a cap of a bottle, the deep neural network may skip generation of a predicted sub-type label for the object.

In some implementations, the device 124 may present information about the predicted sub-type labels on a display 130. For instance, the device 124 may generate instructions to cause presentation of a user interface on the display 130 that indicates the location of each of the objects in the depicted image, e.g., with respect to each other, the predicted sub-type labels for the objects, e.g., potentially including the "unknown object" label, or both.

The training system 102 is an example of a system implemented as computer programs on one or more computers in one or more locations, in which the systems, components, and techniques described in this document are implemented. The device 124 may include personal computers, mobile communication devices, and other devices that can send and receive data over a network 122. The device 124 may be a fixed device, e.g., as part of an inventory system. In some examples, the device 124 may be a mobile device, e.g., a smart phone. The network 122, such as a local area network (LAN), wide area network (WAN), the Internet, or a combination thereof, connects the device 124, and the training system 102. The training system 102 may use a single server computer or multiple server computers operating in conjunction with one another, including, for example, a set of remote computers deployed as a cloud computing service.

Table 1, below, shows example pseudo code for training the deep neural network 116. The training system 102 may perform the steps described in Table 1.

TABLE 1

Deep Neural Network Training

//preparation phase
    create a "detector_config" file which will contain all data about how the deep neural network needs to be configured including, among other data:
        -input size
        -maximum number of training iterations
        -number of images in a batch for processing during a single training iteration
        -hyper-parameters configuration (e.g. learning rate, momentum)
        -image permutation/distortion (determined automatically, from user input, or both):
            ->For every image permutation method among the available ones, the probability the permutation method could be used during any given training step, and the range/intensity of the distortion, if applicable
                ->Exclude any permutations that are not compatible with the objects to be detected (e.g., if the deep neural network will determine whether the sun is out or a promotional display light is turned on or off, then the system will not perform brightness/luminosity randomization)
    parse the dataset of images and annotations (bounding boxes) to create a list of all unique object sub-types in the dataset
    save the list of object sub-types in the detector_config file
    while parsing the dataset, push a pair (width, height) for every bounding box for every image for every object sub-type, in a single list. Furthermore, push in the list slightly bigger and slightly smaller variations of these bounding boxes.
    perform the k-means algorithm on the bounding box list, with k = 9, and find the 9 centroids of the dataset. These 9 pairs (width, height) will work as the 9 anchor boxes.
    save the anchor boxes on the detector_config file
//training phase
    load the detector_config file
    load the bare uninitialized detection model
    optionally initialize the weights of the first few layers using the weights from a previously trained classification model
    set up a counter to keep track of the number of performed training iterations
    while the number of training iterations is lower than the maximum number of training iterations, perform the following steps (optionally in parallel):
        - ON CPU: continuously load images, perform all the pre-processing and optionally data permutation steps specified in the detector_config file, and enqueue these images on a FIFO training queue
        - ON GPU: any time the training queue has enough images to fill a batch (as specified by the detector_config file), load these images in GPU memory and perform one deep learning training iteration (standard back propagation with gradient descent training methodology).

In some implementations, the training system 102, e.g., the image selection module 110, may pre-process data for every image used by the deep neural network 116 during training. For example, the training system may regularize pixel values for each image during pre-processing, e.g., by subtracting the mean pixel value of the dataset, converting the image representation to float with values standardized between zero and one, resizing the image to the desired input size, or a combination of two or more of these.

In some implementations, the training system 102 may optionally permute image data as described in more detail above. The training system 102 may perform image data permutation during some training iterations, ignore image permutation during some training iterations, or both. Some examples of image permutation include image flipping, zooming, padding, or a combination of two or more of these.

Figure 2:
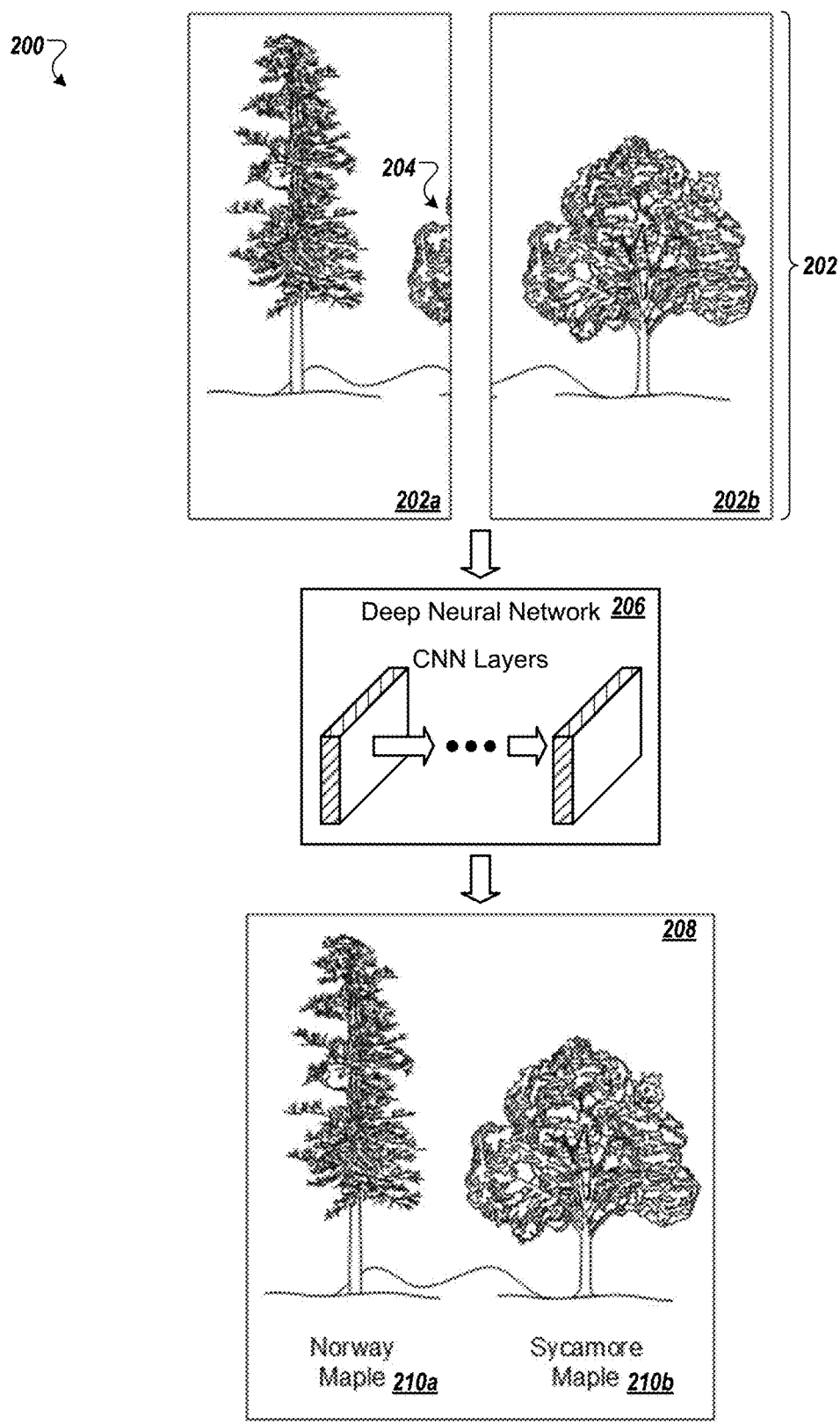
FIG. 2 is an example of an environment in which a deep neural network determines predicted sub-type labels using image data.

FIG. 2 is an example of an environment 200 in which a deep neural network 206 determines predicted sub-type labels using image data 202. A system may use the sub-type labels with image data to generate a representation 208 of the image data 202.

A camera, e.g., the camera 128, captures one or more images that depict physical content. The camera may provide the image data 202 for the image to a feature extraction system (not shown). The feature extraction system may use any appropriate algorithm to determine features represented by the one or more images. In some implementations, the feature extraction system may use an Oriented FAST and rotated BRIEF (ORB) local feature detector to determine the features in the one or more images.

The feature extraction system may use any appropriate type of data to represent the extracted features. For example, the feature extraction system may use vectors or another type of feature data to represent the extracted features.

When the feature extraction system receives data for multiple images, e.g., two or more images, the feature extraction system, or another system, may analyze the multiple images to determine whether to stitch some of the multiple images together, e.g., using the extracted features. The feature extraction system, or another system, may stitch multiple images together when the multiple images depict the same content, such as a scene in nature shown in FIG. 2. The feature extraction system, or the other system, may stitch only pairs of images at a time. The feature extraction system, or the other system, may stitch together only images that have less than a threshold amount of overlapping content. For example, the feature extraction system, or the other system, may stitch together two images that depict less than fifty percent of the same content, less than thirty percent of the same content, or less than or equal to thirty percent of the same content.

The feature extraction system may use any appropriate algorithm to determine whether to stitch some of the multiple images together. For instance, the feature extraction system may analyze the features of adjacent images, e.g., images taken sequentially in time without intervening images, to determine features that are included in both of the adjacent images. The feature extraction system may store, in memory, data identifying features that are included in potentially adjacent images. The feature extraction system may analyze the features included in the potentially adjacent images to determine an adjacency confidence score that indicates whether the two images depict the same physical content, e.g., the same scene. For example, the feature extraction system determines whether particular features, e.g., features 204, are included in both first image data 202a and second image data 202b. The feature extraction system uses a result of the determining whether particular features are included in both the first image data 202a and the second image data 202b to generate an adjacency confidence score for the first image data 202a and the second image data 202b. The feature extraction system compares the adjacency confidence score with a threshold adjacency confidence score. When the adjacency confidence score does not satisfy the threshold adjacency confidence score, the feature extraction system may determine to skip stitching the first image data 202a and the second image data 202b together. In some examples, the feature extraction system may use mathematical image feature matching and homography estimation to determine whether two images include the same features.

When the adjacency confidence score satisfies the threshold adjacency confidence score, the feature extraction system may determine that the two images are adjacent images and to stitch the first image data 202a together with the second image data 202b. In some implementations, the feature extraction system may calculate, for each pair of adjacent images from the multiple images, a homography matrix. The feature extraction system may use the homography matrix to determine the relative position of the adjacent images with respect to each other, the relative position of a camera that captured the adjacent images, or both. The relative position of the camera that captured the adjacent images may be a relative position of the same camera that captured both images or the relative positions of two different cameras that respective captured the first and second images. The feature extraction system uses the homography matrix to project data for the first image and data for the second image on a single plane, e.g., to create a projected image that includes the data for the first image and the second image. The feature extraction system can use the projected image to determine features included in the projected image from the first image data 202a and the second image data 202b.

The deep neural network 206 receives feature data from the feature extraction system and determines predicted sub-type labels 210a-b for objects represented by the feature data. The predicted sub-type labels can indicate object sub-type names the deep neural network 206 determines have at least a threshold likelihood of representing the name of a corresponding object depicted in the image. The deep neural network 206 may be a detector, e.g., and generate multiple sets of output data as described with reference to FIG. 1 and the deep neural network 116. For instance, the deep neural network 206 may provide multiple sets of output data to a runtime system that analyzes confidence scores, e.g., object confidence scores, regions defined by location information, or both, to determine which sets of output data to keep. The output data the system keeps may define the predicted sub-type labels and corresponding locations of objects likely depicted in the image data 202.

The deep neural network 206 may receive the first feature data 202a and the second feature data 202b, separately, from the feature extraction system and analyze the feature data separately, e.g., when the feature extraction system determines that the first and second images do not depict the same physical content. In some examples, the deep neural network 206 receives feature data for a projected image, e.g., when the feature extraction system determines that first and second image depict the same physical content.

The deep neural network 206 may determine data for use generating a representation of the received feature data. For instance, the deep neural network 206 may provide the predicted sub-type labels 210a-b to user interface module that generates instructions for presentation of a representation 208 of the images along with the predicted sub-type labels 210a-b. The user interface module may use the predicted sub-type labels 210a-b and the projected image to generate the representation 208 when the sub-type labels 210a-b include data for multiple images. The user interface module may use the predicted sub-type labels 210a-b and data for a single image to generate the representation when the sub-type labels 210a-b include data only for the single image.

In some implementations, the deep neural network 206 may process image data 202a-b for the two images separately. For instance, the deep neural network 206 may receive the first image data 202a and determine predicted sub-type labels for the first image. The deep neural network 206 may separately receive the second image data 202*b* and determine predicted sub-type labels for the second image.

A system that includes the deep neural network 206, e.g., the training system 102 or a runtime system, may then determine, after receiving output from the deep neural network 206, whether to stitch some of the multiple images together. For instance, the system may use feature analysis, as described above, to determine whether multiple images include the same features.

In some examples, the system may determine whether output data for two or more of the images identify the same predicted sub-type labels. The system may use patterns of common objects included in multiple images when determining whether to stitch some of multiple images together. For example, the system may determine whether separate output data, for two images, received from the deep neural network 206 each identify a sycamore maple. When the output data for the first image data 202*a* identifies an object with a predicted sub-type label of sycamore maple, and the output data for the second image data 202*b* identifies an object with a predicted sub-type label of sycamore maple the system may determine that the two images depict the same content and to stitch the two images together. In some examples, the system may only determine to stitch two images together using patterns that include two or more objects.

In some implementations, the system may use a size of objects depicted in an image to determine whether to use feature analysis or predicted sub-type labels for image stitching analysis. For instance, the system may determine that objects with a larger size ratio compared to the total image size should be analyzed using predicted sub-type labels and objects with a smaller size ratio compared to the total image size should be analyzed using image features. The system may determine an actual size of the objects, e.g., using the predicted sub-type labels, and a camera distance from the object when a corresponding image was captured. The system may use the distance when determining a method for image stitching analysis. For instance, when the distance satisfies a threshold value, the system may use feature analysis to determine whether to stitch two images together. When the distance does not satisfy a threshold value, the system may use predicted sub-type labels to determine whether to stitch two images together.

In some implementations, the system may use multiple methods to determine whether to stitch two images together. For instance, the system may first use feature analysis, then use predicted sub-type labels to determine whether to stitch two images together. The system may first use predicted sub-type labels and then use feature analysis do determine whether to stitch two images together. When the system determines, using a first method, e.g., either feature analysis or predicted sub-type labels, that two images should not be stitched together, the system may use a second method. In some examples, during runtime, the system may provide a prompt, e.g., to a user, requesting input indicating whether two images should be stitched together. In response to receipt of user input indicating that two images should be stitched together, the system may stitch two images together.

In some implementations, the deep neural network 206 may analyze feature data for three or more images. For instance, the feature extraction system may determine to stitch together four images, an upper left image, an upper right image, a lower left image, and a lower right image, to create the projected image. The feature extraction system may determine feature data for the projected image created from the four images. The deep neural network 206 may receive the feature data for the projected image created from the four images and determine the predicted sub-type labels 210*a-b*.

In some implementations, when a confidence score does not satisfy a threshold confidence score and the feature extraction system determines to skip stitching the first image data 202*a* and the second image data 202*b* together, the feature extraction system may determine whether to generate a user prompt requesting recapture of one or more images. For example, the feature extraction system, or another system, may determine whether the images were captured within a threshold period of time, whether an adjacency confidence score for the two images satisfies a second adjacency threshold confidence score that is less restrictive than the threshold adjacency confidence score, or both. When the feature extraction system determines that the images were captured within the threshold period of time, that the adjacency confidence score satisfies the second threshold adjacency confidence score, or both, the feature extraction system generates instructions to cause presentation of a user interface that prompts a user, e.g., of the device 124 that includes the camera 128, to recapture one or both of the images. The user interface may depict the image or images for which recapture is requested. The feature extraction system may analyze the recaptured images to determine whether the recaptured images are adjacent to any other images, e.g., that were previously taken or included in the recapture.

In some implementations, when the deep neural network 206 receives feature data for the first image, separately from or without receiving feature data for the second image, the deep neural network does not determine predicted sub-type labels for content that is not substantially depicted in the first image. For instance, the deep neural network 206 may determine the predicted sub-type label of "Norway Maple" 210*a* for the tree depicted in the first image, without determining the predicted sub-type label of "Sycamore Maple" 210*b* for the tree depicted in the second image.

Figure 3A:
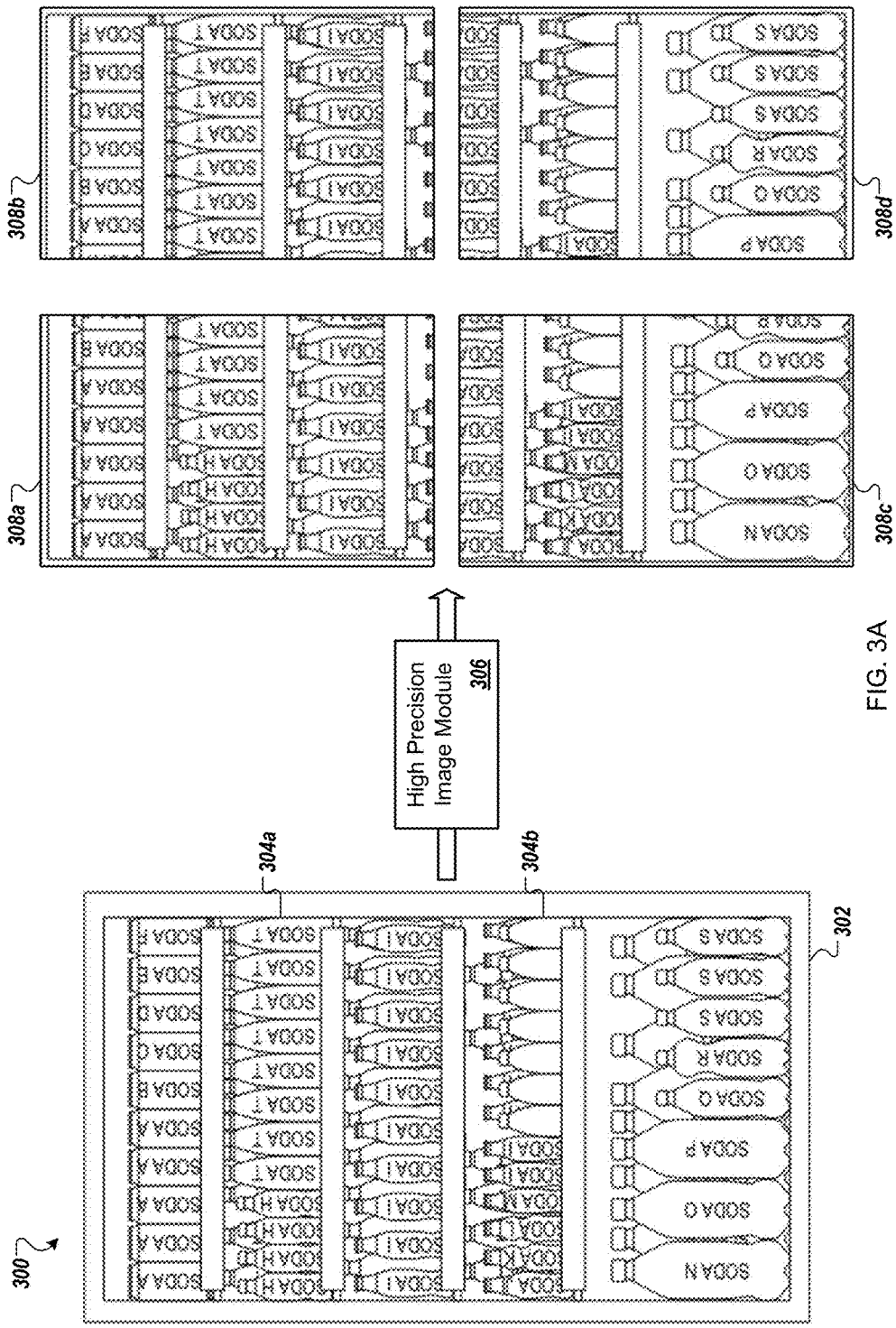
FIGS. 3A-B are an example of an environment in which a deep neural network determines predicted sub-type labels for portions of an image.
Figure 3B:
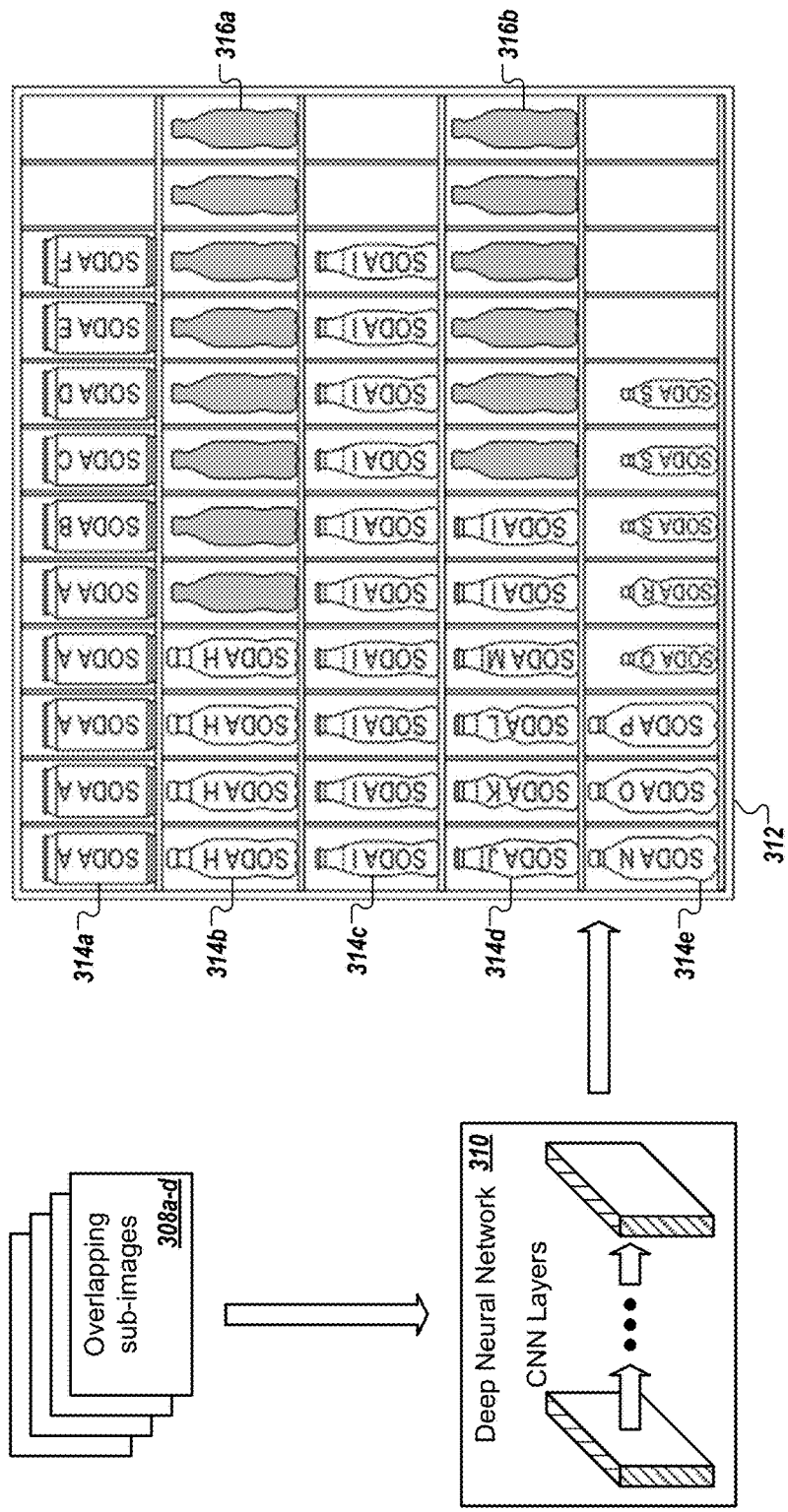

FIGS. 3A-B are an example of an environment 300 in which a deep neural network 310 determines predicted sub-type labels for portions of an image. For instance, a system may determine that one or more confidence scores for predicted sub-type labels do not satisfy a threshold confidence score. In response, the system may determine to divide the image into portions to try and increase the confidence scores for the predicted sub-type labels, e.g., so that the confidence scores satisfy the threshold confidence score.

The system may receive, from a deep neural network, e.g., the deep neural network 310 shown in FIG. 3B, predicted sub-type labels for objects represented by the image data, shown in FIG. 3A, and, for each of the predicted sub-type labels, a corresponding confidence score. Each of the confidence scores may indicate a likelihood that the respective object represented by the image data 302 has the corresponding predicted sub-type label. The deep neural network may generate the confidence scores using any appropriate method.

The system may compare one or more of the confidence scores, each for a corresponding predicted sub-type label, with a threshold confidence score to determine whether the compared confidence scores satisfy a threshold confidence score. For instance, the system may compare the confidence scores with the threshold confidence score until determining that all confidence scores satisfy the threshold confidence score or that at least one of the confidence scores does not satisfy the threshold confidence score. A score may satisfy the threshold confidence score when the score is greater than the threshold confidence score, equal to the threshold confidence score, or both. In some examples, a score may satisfy the threshold confidence score when the score is less than the threshold confidence score, equal to the threshold confidence score, or both.

When the system determines that each of the confidence scores satisfies the threshold confidence score, or that at least a minimum number of the confidence scores satisfy the threshold confidence score, the system may generate a representation of the image using the image data 302 and the predicted sub-type labels for the objects depicted in the image. In some examples, the system may generate a representation that indicates which of the predicted sub-type labels have confidence scores that do not satisfy the threshold confidence score.

When the system determines that a confidence score for the predicted sub-type labels does not satisfy the threshold confidence score, the system may provide the image data 302 to a high precision image module 306, shown in FIG. 3A. The system, and the high precision image module 306, may be part of the device 124, e.g., that uses a deep neural network to determine predicted sub-type labels for objects depicted in an image. The device may receive the high precision image module 306 from the training system or another system.

The high precision image module 306 analyzes the image data 302 to create multiple image data portions 308a-d of the image data 302 for analysis by the deep neural network 310. The high precision image module 306 may create overlapping image data portions 308a-d that each include some of the image data 302 that is also include in another one of the image data portions 308a-d. For instance, a first image data portion 308a includes image data on the right hand side of the first image data portion 308a that is also included in a second image data portion 308b and includes image data on the bottom of the first image data portion 308a that is also included in a third image data portion 308c.

The system provides, separately, the image data portions 308a-d to the deep neural network 310, as shown in FIG. 3B. The deep neural network 310 receives data for the first image data portion 308a as input. The deep neural network 310, e.g., the deep neural network 116 or the deep neural network 126, generates, as output, predicted sub-type labels for the objects represented by the first image data portion 308a, confidence scores for the predicted sub-type labels, or both. The deep neural network 310 may generate, as output, data that indicates a location at which each of the objects is depicted in an image represented by the first image data portion 308a. The deep neural network 310 receives data for the second image data portion 308b as input and generates corresponding output. The deep neural network 310 processes, separately, data for the third image data portion 308c and data for the fourth image data portion 308d. The deep neural network 310 may process, separately, data for the image data portions in any appropriate order.

The system receives the output from the deep neural network 310. The system may combine the outputs for the different image data portions 308a-d, analyze the outputs for each of the image data portions 308a-d, or both. The system may compare the confidences scores, included in the output, with the threshold confidence score. When the system determines that the confidence scores satisfy the threshold confidence score, the system may generate a representation 312 of the image that includes the predicted sub-type labels, a location for each of the objects associated with the predicted sub-type labels, e.g., with respect to the other objects, or both. The predicted sub-type labels included in the representation 312 may include a sub-type name for the respective object, an image 314a-e of the respective object, or another type of label.

In some examples, the system may generate a projected image using output data received from the deep neural network 310 to combine data for the different image data portions 308a-d, e.g., to generate the representation 312. For example, the system may align data for the different image data portions 308a-d and use the aligned data to generate the representation 312. The system may use locations for objects represented by the image data portions 308a-d to determine an alignment for the different image data portions 308a-d. When the objects include soda bottles, the system may determine that multiple objects are on the same self, are in rows stacked on top of each other, etc., using the locations of the corresponding objects. When the objects are close together and on the same row, the system may determine that the objects are on the same shelf. When the objects are grouped vertically with gaps between adjacent objects, e.g., a gap of at least a threshold amount, the system may determine that the objects are on adjacent shelves. When the objects are grouped vertically without gaps between them, or with gaps that are less than a threshold amount, the system may determine that the objects are stacked on top of each other. In some implementations, the system may determine a type of object for which the deep neural network 310 performs analysis, and use the type of object when generating the representation 312. For instance, when the type of the object is maple tree, the system may determine that two trees are approximately at the same level and generate a representation that indicates the bases of the trees are approximately the same.

The locations for each of the objects may be indicated by the coordinates at which the object was depicted in the image, e.g., x-y coordinates or x-y-z coordinates or x-y coordinates with a width and a height for the object, a location with respect to the other objects depicted in the image, e.g., as shown in FIG. 3B, or other appropriate location data. The system may use the location information for each of the objects, e.g., anchor box information, to automatically determine locations of the objects with respect to each other and dynamically generate the representation 312. The width and the height for the object may include the width and the height of a corresponding anchor box that surrounds the object. For instance, the x-y coordinates may be for the upper left corner of the anchor box, or another appropriate corner.

When the system determines that one of the confidence scores does not satisfy the threshold confidence score, or that a predetermined number of the confidence scores each do not satisfy the threshold confidence score, the system may provide image data to the high precision image module 306. The high precision image module 306 may generate additional image data portions. For instance, the system may determine that the confidence scores for the first image data portion 308a, the second image data portion 308b, and the third image data portion 308c satisfy the threshold confidence score but that at least one confidence score for the fourth image data portion 308d does not satisfy the threshold confidence score. The system may provide data for the fourth image data portion 308d to the high precision image module 306 to cause the high precision image module 306 to create multiple image portions for the fourth image data portion. The high precision image module 306 may create any appropriate number of overlapping image portions.

In some implementations, the system may determine whether to create multiple portions of image data for an image before sending data for the image to the deep neural network 310. For instance, the high precision image module 306 may analyze the image data 302 to determine whether there are multiple overlapping objects depicted in the image. When the high precision image module 306 determines that there are at least a threshold number of overlapping objects depicted in the image, the high precision image module 306 may determine to generate multiple overlapping image portions of the image data 302. When the high precision image module 306 determines that there are not likely at least a threshold number of overlapping objects depicted in the image, the system may provide the image data 302 to the deep neural network 310 for analysis. After determining that there are not likely at least a threshold number of overlapping objects depicted in the image and providing the image data 302 to the deep neural network 310, the system may later determine to create multiple image portions for the image data 302, e.g., when some of the confidence scores generated by the deep neural network 310 using the image data 302 as input do not satisfy a threshold confidence score.

In some implementations, the system may use a combination of one or more of confidence scores, potential overlap of objects depicted in an image, or a size of objects depicted in an image when determining whether to create multiple overlapping image portions of image data. The size may be an average size of objects depicted in an image.

For instance, when the system, e.g., the high precision image module 306, determines that a size of an object depicted in the image is less than one third the size of the image, the high precision image module 306 may determine to create multiple overlapping portions. In some examples, the high precision image module 306 may determine to create multiple overlapping portions when an average size of determined objects depicted in the image is less than one third the size of the image. The size of the image may be based on the height, width, or both, of the image. The determined objects may be objects determined to likely be included in the image without a determination of a sub-type label for the object.

In some implementations, the system may use a total current processing duration when determining whether to create multiple overlapping portions of image data. For instance, the system may compare the total current processing duration, e.g., indicated based on a difference between the current time and a time at which the system received the image data, with a threshold processing duration. When the system determines that the total current processing duration satisfies the threshold processing duration, e.g., is greater than or equal to or both, the system may determine to skip generation of multiple overlapping portions or additional multiple overlapping portions when multiple overlapping portions were already generated. When the system determines that the total current processing duration does not satisfy the threshold processing duration, e.g., is less than or equal to or both, the system may determine to generate multiple overlapping portions or to generate additional multiple overlapping portions when multiple overlapping portions were already generated.

The deep neural network 310 may generate a label that indicates that a corresponding object is unknown. For example, when the deep neural network 310 is trained using negative training data, the objects depicted in the negative training data may each be associated with an "unknown object" label, e.g., to indicate that these objects are not objects of the sub-type for which the deep neural network 310 is being trained.

When analyzing image data, the deep neural network 310 may determine, for some of the objects, a confidence score that the object is unknown. When the confidence score for the unknown label is higher than confidence scores for other labels for which the deep neural network 310 was trained, the system may generate a representation 312 that includes "unknown object" labels. The "unknown object" label may include the word "unknown," a grayed image 316a-b that indicates that the deep neural network 310 has at least a minimum confidence that the object is unknown, or another type of label that identifies the respective object as unknown.

In the example described with reference to FIGS. 3A-B, the image data 302 includes data for "soda T" 304a and a water bottle 304b (both of which are shown in FIG. 3A), neither of which are included in the object sub-types for which the deep neural network 308 was trained. As a result, the output generated by the deep neural network 308 indicates a label of "unknown" for each instance of "soda T" and the water bottle that are depicted in the image. When the system generates the representation 312 using the output from the deep neural network 310, the system may include "unknown object" labels for the "soda T" 316a and the water bottle 316b in the representation. The system may use any appropriate unknown object label. For example, the system may use a first unknown object label that resembles a bottle when the object sub-type is a particular brand of soda, e.g., when the deep neural network 310 detects soda sub-types, or a second unknown object label that resembles a tree when the object sub-type is a particular tree species, e.g., when the deep neural network 310 detects tree sub-types.

Table 2, below, shows example pseudo code for runtime use of a deep neural network, e.g., the deep neural network 310 or the deep neural network 206. A system that includes the deep neural network may perform the steps described in Table 2 during runtime.

TABLE 2

Runtime use of the Deep Neural Network

Figure 4:
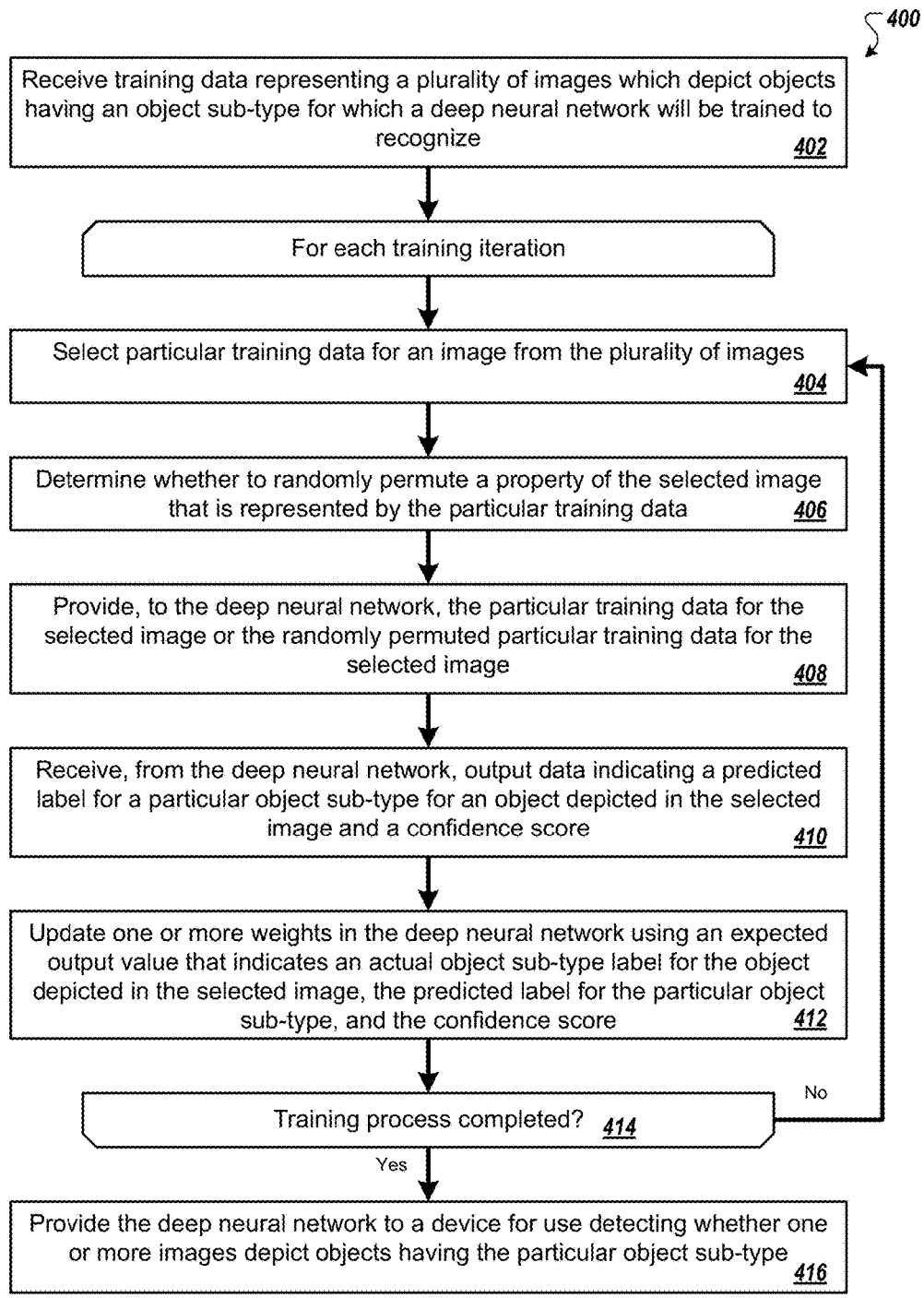
FIG. 4 is a flow diagram of a process for training a deep neural network.

Capture image, e.g., with a mobile device
Convert the image format, e.g., into a format that will be compatible with tensorflow such as openCV
Perform one or more image pre-processing steps that mirror the image pre-processing performed during training, e.g., resize the image to the specified deep neural network input layer size
Load the deep neural network, e.g., using the detector_config file used during training of the deep neural network
  Provide the pre-processed image into the deep neural network
  Perform inference and detect the objects
  Prune objects with low confidence scores and objects marked for removal by non-maximum suppression
  If the mean width, height, or both, of the non-pruned objects is below a certain threshold, enter high accuracy mode:
    Load a higher resolution version of the image
    Divide this image in four quadrants with overlap, e.g. when the input image has a 1280*960 resolution, create four images with a 720*550 resolution
    Perform object sub-type detection as described above on each of the four quadrants
    Eliminate double detections in the overlap areas, e.g., by stitching adjacent images together
  Generate a representation of the image using the non-pruned objects FIG. 4 is a flow diagram of a process 400 for training a deep neural network. For example, the process 400 can be used by the training system 102 from the environment 100.

A training system receives training data representing a plurality of images which depict objects having an object sub-type for which a deep neural network will be trained to recognize (402). The training data may include images, data representing images, or both. The objects depicted in the images from the plurality of images include at least one object having an object sub-type for which the deep neural network will be trained. In one or more embodiments, all of the object sub-types may be sub-types of a single object type. For example, when an object type is "maple" some object sub-types may include sycamore maple and Norway maple.

Some of the images in the plurality of images might not depict any objects having a sub-type for the object type. For instance, some of the images may include negative training examples for object types or object sub-types for which the deep neural network will not be able to generate predicted sub-type labels. Some examples of negative training data include data for a hill, e.g., when the deep neural network is being trained to identify tree sub-types, or data for a shelf, e.g., when the deep neural network is being trained to identify products, such as soda, which are typically located on a shelf.

In some implementations, the deep neural network may have at least one output for each different object sub-type for which the deep neural network is trained. The output for each different object sub-type may indicate a confidence score that represents a likelihood that a depicted object has the corresponding object sub-type. The deep neural network might have one output for unknown object sub-types. For instance, the training system can train the deep neural network to label each of the negative training examples as corresponding to the unknown object sub-type output. When the deep neural network is trained to identify a particular brand of soda, or particular type of tree, the training system can train the deep neural network to label soda for a different brand or trees of a different type with the unknown object sub-type label.

In some implementations, the training system may train the deep neural network to have multiple categories of unknown object sub-types. For instance, when the deep neural network is trained to identify maple tree sub-types, the deep neural network may have unknown labels for bushes, flowers, horse chestnut trees, rocks, or separate labels for each of a combination of two or more of these. When the deep neural network is trained to identify products of a particular brand, e.g., "brand A," the deep neural network may have unknown labels for other brands of products, e.g., "brand B" and "brand C," for other types of products, e.g., when brand A makes products of a particular type, or both.

For each training iteration, the training system selects particular training data for an image from the plurality of images (404). The training system may select training data for one image or multiple images. The training system may use a predetermined number of multiple images for each iteration to optimize the training process, e.g., to improve the accuracy of the deep neural network while reducing the number of times the training system updates the weights for the deep neural network.

The training system determines whether to randomly permute a property of the selected image that is represented by the particular training data (406). For each image in the iteration, the training system may determine whether to randomly permute a property of the image or to use the training data for the image without a random permutation. When an iteration includes multiple images, the training system may determine at least one image in the multiple images for which a property should be randomly permuted. Some examples of random permutations may include cropping a portion of the selected image, adjusting a zoom level for at least a portion of the selected image, adjusting a stretch value for at least a portion of the selected image, transposing the selected image over an axis, adjusting at least one color depicted in the selected image, adjusting an alpha jitter for at least a portion of the selected image, adjusting a shear distortion for at least a portion of the selected image, adjusting a homography for at least a portion of the selected image, or a combination of two or more of these. The training system may determine to randomly permute a property of an image that includes negative training data, e.g., any portion of the image, or a property of an object that is not of the sub-type for which the deep neural network is trained.

The training system provides, to the deep neural network, the particular training data for the selected image or the randomly permuted particular training data for the selected image (408). For instance, the training system provides, to the deep neural network, the training data for each image of the iteration separately. The training data may include data that was randomly permuted, e.g., when the training system determined to randomly permute a property of the corresponding image.

The training system receives, from the deep neural network, output data indicating a predicted label for a particular object sub-type for an object depicted in the selected image and a confidence score (410). For example, in response to providing the training data to the deep neural network, the training system receives the output data from the deep neural network. The output data indicating the predicted label may include a confidence score, e.g., a highest confidence score for the particular object depicted in the image, that indicates the predicted label.

The confidence score may be an object confidence score, e.g., that represents a likelihood that the object exists in the region of the selected image defined by the location information. The confidence score may be a label confidence score, e.g., that represents the likelihood that the object depicted in the selected image has the particular object sub-type.

In some implementations, the training system may train the deep neural network to detect a location of objects in depicted images in addition to determining predicted sub-type labels. In these implementations, the training system receives, from the deep neural network, output data that indicates a predicted location of a corresponding object in a respective image along with a predicted sub-type label for the object.

The training system updates one or more weights in the deep neural network using an expected output value that indicates an actual object sub-type label for the object depicted in the selected image, the predicted label for the particular object sub-type, and the confidence score (412). The training system may use any appropriate method to update the weights of the deep neural network using the output data received from the deep neural network. When the output data includes a predicted location of a corresponding object in a respective image, the training system may update the weights in the deep neural network using the predicted location, an actual location of the corresponding object in the respective image, or both.

The training system determines whether a training process is completed (414). For instance, the training system may determine whether a predetermined number of training iterations have been performed, an accuracy of the deep neural network satisfies a threshold accuracy, or another appropriate condition is satisfied. When the training system determines that the training process is not complete, the training system may select particular training data for another image from the plurality of images, e.g., proceed to step 404. When the training system determines that the training process is complete, the training system may store the deep neural network in memory, proceed to step 416, or both.

The training system provides the deep neural network to a device for use detecting whether one or more images depict objects having the particular object sub-type (416). For example, the training system may provide the deep neural network to a device, e.g., a mobile device, using a network.

In some implementations, the process 400 can include additional steps, fewer steps, or some of the steps can be divided into multiple steps. For example, the training system may perform steps 404 through 414 without performing step 402, step 416, or both.

Figure 5:
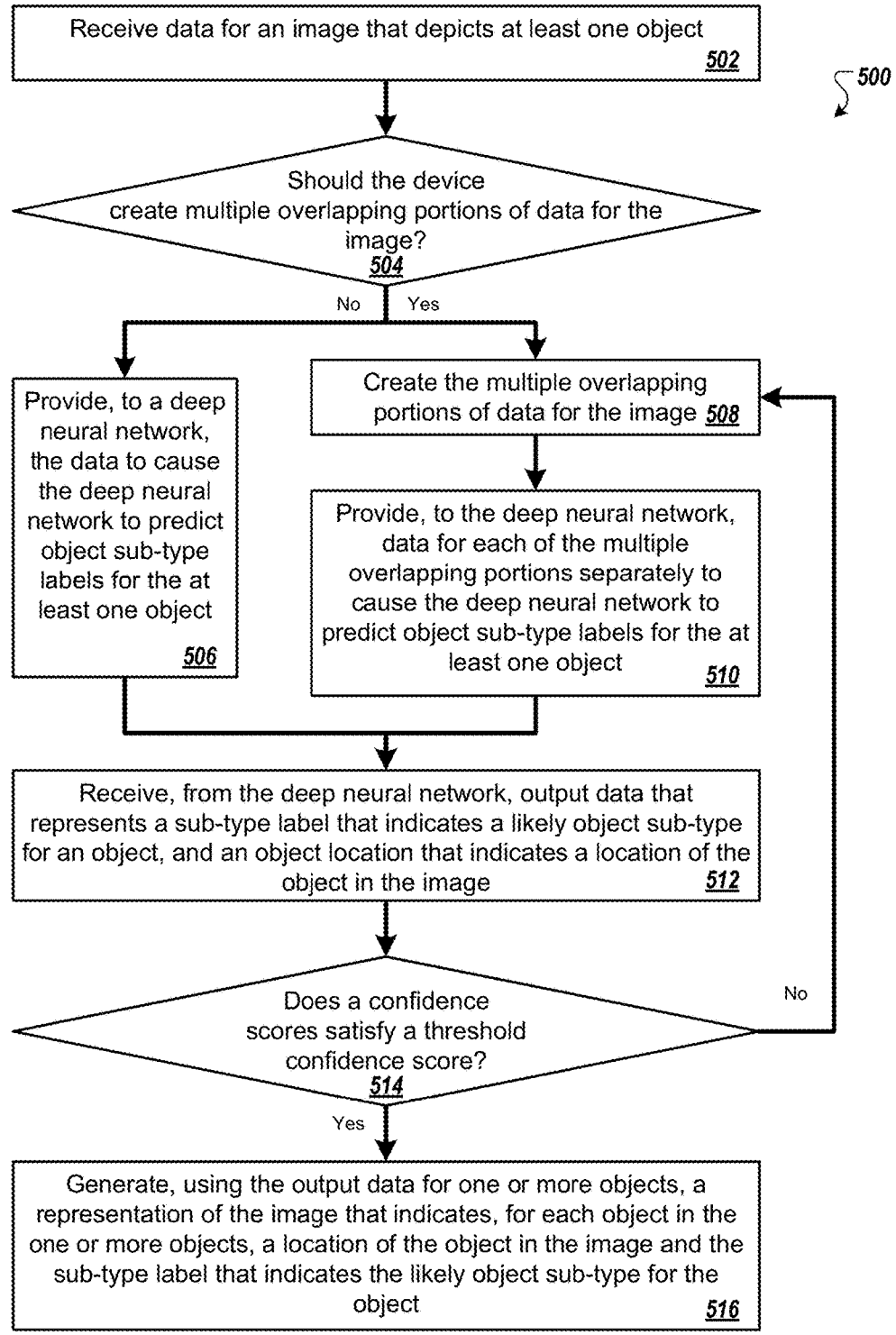
FIG. 5 is a flow diagram of a process for generating a representation of an image.

FIG. 5 is a flow diagram of a process 500 for generating a representation of an image. For example, the process 500 can be used by the device 124 from the environment 100.

A device receives data for an image that depicts at least one object (502). For instance, a camera, included in the device, may capture data for the image.

The device determines whether to create multiple overlapping portions of data for the image (504). The device may determine a size of objects depicted in the image, a predicted quantity of objects depicted in an image, confidence scores generated by the deep neural network that a respective object depicted in the image has a predicted sub-type label, a combination of two or more of these, or another appropriate method or combination of methods to determine whether to create multiple overlapping portions of data for the image. For instance, the system may determine that one or more confidence scores, each for an object depicted in an image, do not satisfy a threshold confidence score and that the device should create multiple overlapping portions of data for the image.

In some examples, the device may determine that a size ratio, for a size of an object depicted in the image to the total image size, does not satisfy a threshold ratio and that the device should create multiple overlapping portions of data for the image. When a predicted quantity of objects satisfies, e.g., is greater than, a threshold quantity of objects, or the sizes of the objects satisfy, e.g., are less than, a threshold size, or both, the device may determine to create multiple overlapping portions of data for the image.

When the device determines not to create multiple overlapping portions of data for the image, the device provides, to a deep neural network, the data for the image to cause the deep neural network to predict object sub-type labels for the at least one object (506). The device may generate data that represents the image, e.g., vectors, and provide the generated data to the deep neural network. The device may provide any appropriate type of data to the deep neural network, e.g., based on the input data for which the deep neural network was trained.

In response to determining to create multiple overlapping portions of data, the device creates the multiple overlapping portions of data for the image (508). For example, the device may determine a quantity of overlapping portions to create based on the size of the objects depicted in the image, a quantity of objects depicted in the image, or both. When the ratio of the size of the objects to the size of the image is low, e.g., the objects are very small compared to the overall size of the image, or when the quantity of objects depicted in the image is high, the device may create a greater number of overlapping portions of data than if the size ratio were greater, e.g., closer to one, or the quantity of depicted objects were lower.

The device provides, to the deep neural network, data for each of the multiple overlapping portions separately to cause the deep neural network to predict object sub-type labels for the at least one object (510). For example, the device provides data for a first overlapping portion to the deep neural network and receives corresponding first output, e.g., as part of step 512. The device provides data for a second overlapping portion to the deep neural network and receives corresponding second output.

The device receives, from the deep neural network, output data that represents a sub-type label that indicates a likely object sub-type for an object, and an object location that indicates a location of the object in the image (512). The output data that represents a sub-type label may be a confidence score that indicates a likelihood that the object has the corresponding sub-type label.

The device determines whether a confidence score satisfies a threshold confidence score (514). For example, the device may compare the confidence score for at least one of the objects depicted in the image, or that is represented by one of the multiple overlapping portions of data for the image, with a threshold confidence score.

When the confidence score does not satisfy the threshold confidence score, e.g., the confidence score is less than, equal to, or both, the device may create multiple overlapping portions of data for the image. When the device already created multiple overlapping portions of data for the image, the device may determine to divide only the portion that includes data for the object, all of the portions, or another proper subset of the portions. For instance, since the portions are overlapping, the device may determine that two of the portions include data for the object and determine to divide each of the two portions into additional, smaller sub-portions. The device may determine sub-portions for the two portions jointly or separately. For instance, the device may determine sub-portions for a first portion and sub-portions for a second portion. In some examples, the device may determine sub-portions for the two portions together.

When the device determines that one or more of the confidence scores satisfy the threshold confidence score, e.g., that all of the scores satisfy the threshold confidence score, the device generates, using the output data for one or more objects, a representation of the image that indicates, for each object in the one or more objects, a location of the object in the image and the sub-type label that indicates the likely object sub-type for the object (516). The representation may include sub-type labels that identify a respective sub-type name for each of the objects, a corresponding icons of the sub-type, or another appropriate type of label. When the sub-type labels are icons and the image received by the device depicts multiple occurrences of objects having a particular sub-type some of which show different views of the object sub-type, the representation includes a single icon for each of the occurrences of the object sub-type even though the depictions of the objects in the image may be different.

The device may use the representation to analyze the object sub-types included in the representation. For example, the device may determine a predicted quantity of each of the object sub-types in the image, a variety of object sub-types included in the image, or both, using the representation. The device, or another system, may use the representation to order additional product that should be delivered to a physical location represented by the image, e.g., as part of an inventory system. For instance, when the image depicts a shelf, a fridge, or a freezer at a retail location, the additional product can be ordered for delivery to the retail location. In some examples, the representation may be used to determine changes to a product layout for the objects depicted in the image, e.g., based on the object sub-types included in the representation and the expected object sub-types that should be included in the representation.

In some implementations, the device may generate a user interface that depicts the representation, data for the representation, or both. For instance, the data for the representation may include predicted quantities for the object sub-types, expected quantities for the object sub-types, expected locations for the object sub-types, expected locations for some object sub-types, or a combination of two or more of these. In some examples, the user interface may identify objects that are placed in an incorrect location, e.g., that do not belong on a shelf depicted in the image. The device may generate the user interface in response to user input indicating selection of a "view results" button. In response, the device may load a configuration file that outlines the predicted sub-type labels for which the deep neural network is trained, product presentation compliance rules, e.g., for the retail location, or both. The device may use the configuration file to generate the user interface and cause presentation of the user interface. The user interface may be graphical, e.g., two or three-dimensional, audible, or both.

The order of steps in the process 500 described above is illustrative only, and the generation of the representation of the image can be performed in different orders. For example, the device may receive the output data from the deep neural network, determine whether one or more of the confidence scores included in the output data each satisfy the threshold confidence score, and then determine whether to create multiple overlapping portions of data for the image, e.g., using a result of the first determination.

In some implementations, the process 500 can include additional steps, fewer steps, or some of the steps can be divided into multiple steps. For example, the device may receive the image data, provide data for the image to the deep neural network, and generate the representation without performing one or more of the other steps for the process 500.

In some implementations, a device may include a deep neural network for object disambiguation. For example, when the device receives output data from the deep neural network that identifies a particular object for which two object sub-types are likely to indicate a label for the particular object, the device may use a separate disambiguation deep neural network to determine a predicted object sub-type label for the particular object. For example, the two object sub-types may have confidence scores that are within a threshold distance from each other, that both satisfy a threshold confidence score, e.g., are both greater than a threshold confidence score, or both. The device may determine a disambiguation deep neural network that is particular to one or both of the predicted object sub-types that are likely to indicate a label for the particular object. The device may provide data for the object, e.g., image data for the object, to the disambiguation deep neural network to cause the disambiguation deep neural network to generate second output with predicted object sub-type labels for the particular object. The second output may include predicted object sub-type labels for other objects depicted in the image. The data provided to the disambiguation deep neural network may be data for one of multiple overlapping portions of data for an image. In some examples, the data may be data that is likely to include only or substantially only data for the particular object, e.g., and not include data for any other objects. The device may include multiple disambiguation deep neural networks, some of which may be for different related sub-types. One example of a disambiguation deep neural network includes a deep neural network trained to identify particular types of chap stick and lipstick for a particular producer.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 6:
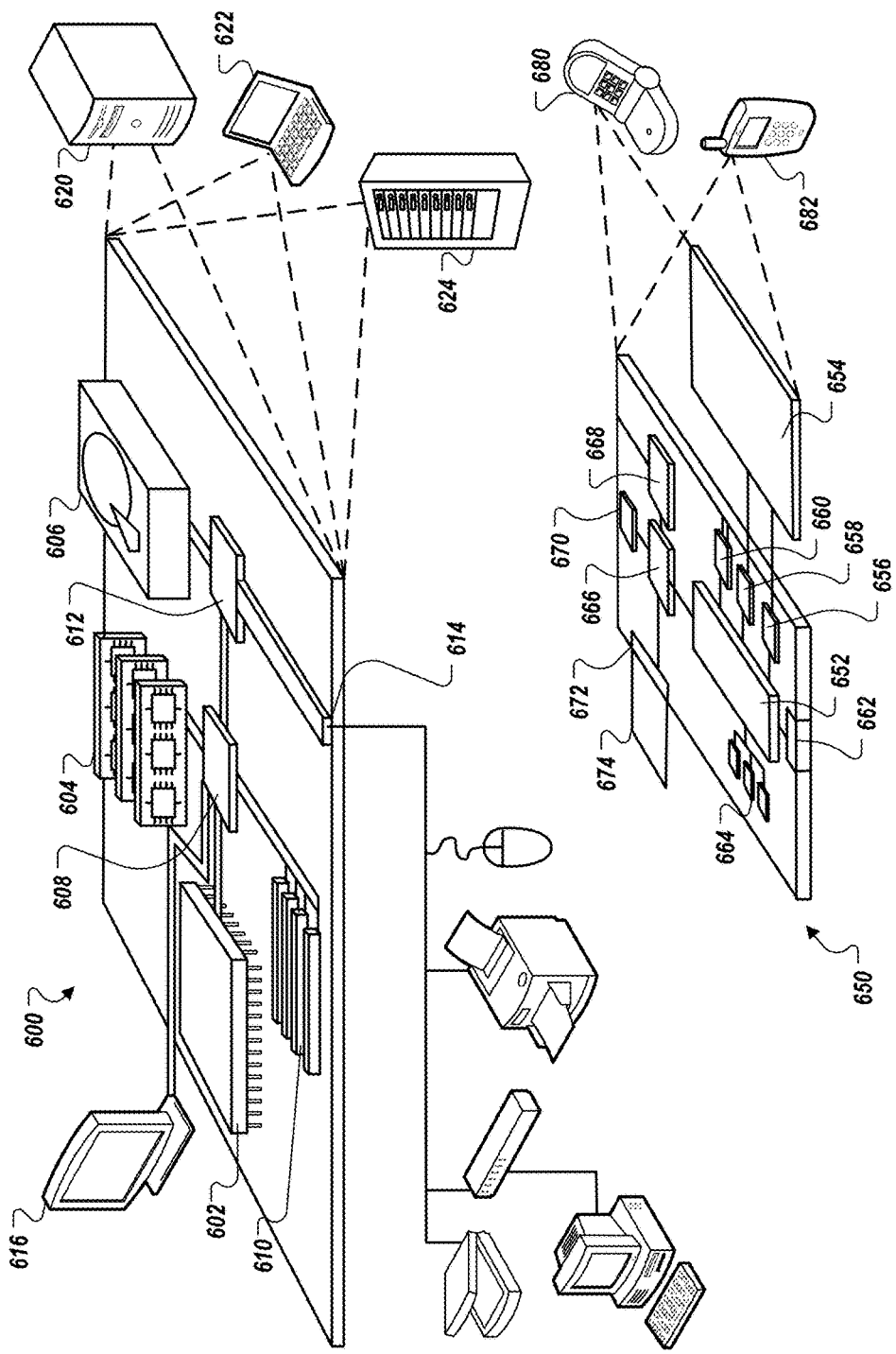
FIG. 6 is a block diagram of a computing system that can be used in connection with computer-implemented methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
providing, to a deep neural network that predicts object sub-type labels of a particular object type for a plurality of objects depicted in an image using a plurality of anchor boxes that each identify a respective box within the image for analysis by the deep neural network, image data for a particular image that depicts a plurality of objects;
receiving, from the deep neural network for each of the plurality of objects, a) output data that identifies a predicted sub-type label that indicates a likely object sub-type of the particular object type for the object, and b) object location data that identifies a likely position of the object in the particular image;
generating, using the output data and the object location data, instructions for presentation of a user interface that identifies, for each of the plurality of objects, the predicted sub-type label for the object at a location in the user interface that corresponds with the likely position of the object in the image; and
providing the instructions to a display to cause the display to present the user interface.

2. The method of claim 1 comprising:
for at least some of the objects in the plurality of objects:
receiving, from the deep neural network, a corresponding confidence score that indicates a likelihood that the object is of the likely object sub-type; and
determining, using the corresponding confidence scores, whether to use a disambiguation deep neural network, different from the deep neural network, to determine an object sub-type label for the object.

3. The method of claim 2, wherein:
receiving the corresponding confidence score that indicates a likelihood that the object is of the likely object sub-type comprises receiving multiple corresponding confidence scores each of which indicates a likelihood that the object is of an object sub-type for which the deep neural network is trained; and
determining, using the corresponding confidence scores, whether to use a disambiguation deep neural network, different from the deep neural network, to determine an object sub-type label for the object comprises determining whether two of the corresponding confidence scores each satisfy a threshold confidence score.

4. The method of claim 3 comprising determining to use the disambiguation deep neural network for an object from the plurality of objects when two of the corresponding confidence scores for the object each satisfy the threshold confidence score.

5. The method of claim 2, wherein:
receiving the corresponding confidence score that indicates a likelihood that the object is of a corresponding object sub-type comprises receiving multiple corresponding confidence scores each of which indicates a likelihood that the object is of an object sub-type for which the deep neural network is trained; and
determining, using the corresponding confidence scores, whether to use a disambiguation deep neural network, different from the deep neural network, to determine an object sub-type label for the object comprises determining whether two of the corresponding confidence scores are within a threshold distance from each other.

6. The method of claim 5 comprising determining to use the disambiguation deep neural network for an object from the plurality of objects when two of the corresponding confidence scores for the object are within a threshold distance from each other.

7. The method of claim 1 comprising:
determining to use a disambiguation deep neural network, different from an initial deep neural network using output from the initial deep neural network, wherein:
the disambiguation deep neural network comprises the deep neural network; and
the initial deep neural network predicts initial object sub-type labels of a primary object type of which the particular object type is a sub-type.

8. The method of claim 1, wherein at least some of the plurality of anchor boxes have a different size, a different shape, or both.

9. The method of claim 1, wherein the deep neural network is trained using location information for each of the plurality of anchor boxes.

10. The method of claim 9, wherein the location information for each of the plurality of anchor boxes comprises x-y coordinates for each of the plurality of anchor boxes.

11. The method of claim 1 comprising:
determining whether to create multiple overlapping portions of data for the particular image that each include a proper subset of data for the particular image; and
in response to determining to create the multiple overlapping portions of data for the particular image, creating the multiple overlapping portions of data for the particular image, wherein providing, to a deep neural network, the image data comprises providing, to the deep neural network, image data for each of the multiple overlapping portions separately.

12. The method of claim 11 comprising:
receiving, for some of the objects in the plurality of objects, a confidence score that indicates a likelihood that the object is of the likely object sub-type, wherein:
determining whether to create multiple overlapping portions of data for the particular image that each include a proper subset of data for the particular image comprises determining, for each of the confidence scores, whether the corresponding confidence score satisfies a threshold confidence score; and
creating the multiple overlapping portions of data for the image is responsive to determining that at least one of the confidence scores does not satisfy the threshold confidence score.

13. The method of claim 11, wherein:
determining whether to create multiple overlapping portions of data for the particular image that each include a proper subset of data for the particular image comprises determining whether a current processing duration satisfies a threshold processing duration; and
creating the multiple overlapping portions of data for the particular image is responsive to determining that the current processing duration satisfies the threshold processing duration.

14. The method of claim 1, wherein:
receiving, from the deep neural network for each of the plurality of objects, the output data comprises receiving, for some objects in the plurality of objects, a confidence score that indicates a likelihood that the object is of the likely object sub-type; and
generating the instructions for presentation of the user interface comprises:
determining that at least one of the confidence scores does not satisfy a threshold confidence score;
determining that a current processing time exceeds a threshold processing time; and
in response to determining that a current processing time exceeds a threshold processing time, determining to generate the instructions for presentation of the user interface despite determining that at least one of the confidence scores does not satisfy a threshold confidence score.

15. The method of claim 1 comprising:
determining a stock of one or more objects from the plurality of objects using the output data, the object location data, or both; and
determining, using the stock of the one or more objects, a quantity of objects to request for delivery to a physical location that includes an area depicted in the image.

16. An object recognition system comprising one or more computers and one or more storage devices on which are stored instructions that are operable, when executed by the one or more computers, to cause the one or more computers to perform operations comprising:
providing, to a deep neural network, image data for an image that depicts a plurality of objects to cause the deep neural network to predict object sub-type labels for each of the plurality of objects;
receiving, from the deep neural network for each of the plurality of objects, a) a confidence score that indicates a likelihood that the object is of an object sub-type, and b) object location data that indicates a likely location of the object in the image;
determining, for at least some of the objects using the corresponding confidence scores, whether to use a disambiguation deep neural network, different from the deep neural network, to determine an object sub-type label for the object; and
generating, using the object sub-types and the object location data, a representation of the image that indicates, for some of the plurality of objects, a likely location of the object in the image and a sub-type label that indicates the object sub-type for the object.

17. The system of claim 16, wherein:
receiving the confidence score that indicates a likelihood that the object is of a the object sub-type comprises receiving, for at least some of the objects in the plurality of objects, multiple corresponding confidence scores each of which indicates a likelihood that the object is of an object sub-type for which the deep neural network is trained; and
determining, for at least some of the objects using the corresponding confidence scores, whether to use a disambiguation deep neural network, different from the deep neural network, to determine an object sub-type label for the object comprises determining, for at least some of the objects, whether two of the corresponding confidence scores each satisfy a threshold confidence score.

18. The system of claim 17, the operations comprising determining to use the disambiguation deep neural network for an object from the plurality of objects when two of the corresponding confidence scores for the object each satisfy the threshold confidence score.

19. The system of claim 16, wherein:
receiving the confidence score that indicates a likelihood that the object is of a corresponding object sub-type comprises receiving, for at least some of the objects in the plurality of objects, multiple corresponding confidence scores each of which indicates a likelihood that the object is of an object sub-type for which the deep neural network is trained; and
determining, for at least some of the objects using the corresponding confidence scores, whether to use a disambiguation deep neural network, different from the deep neural network, to determine an object sub-type label for the object comprises determining, for at least some of the objects, whether two of the corresponding confidence scores are within a threshold distance from each other.

20. The system of claim 19, the operations comprising determining to use the disambiguation deep neural network for an object from the plurality of objects when two of the corresponding confidence scores for the object are within a threshold distance from each other.

21. The system of claim 16, wherein:
generating the representation of the image comprises:
determining that at least one of the confidence scores does not satisfy a threshold confidence score;
determining that a current processing time exceeds a threshold processing time; and
in response to determining that a current processing time exceeds a threshold processing time, determining to generate the representation of the image despite determining that at least one of the confidence scores does not satisfy a threshold confidence score.

22. The system of claim 16, the operations comprising:
determining, using the representation of the image, a stock of one or more objects from the plurality of objects; and
determining, using the stock of the one or more objects, a quantity of objects to request for delivery to a physical location that includes an area depicted in the image.

23. A non-transitory computer storage medium encoded with instructions that, when executed by one or more computers, cause the one or more computers to perform operations comprising:
providing, to a deep neural network that predicts object sub-type labels of a particular object type for a plurality of objects depicted in an image using a plurality of anchor boxes that each identify a respective box within the image for analysis by the deep neural network, image data for a particular image that depicts a plurality of objects;
receiving, from the deep neural network for each of the plurality of objects, a) a confidence score that indicates a likelihood that the object is of an object sub-type of the particular object type, and b) object location data that identifies a likely position of the object in the particular image;
determining, for at least some of the objects using the corresponding confidence scores, whether to use a disambiguation deep neural network, different from the deep neural network, to determine an object sub-type label for the object;
generating, using the object sub-types and the object location data, instructions for presentation of a user interface that identifies, for each of the plurality of objects, a sub-type label for the respective object sub-type at a location in the user interface that corresponds with the likely position of the object in the image; and
providing the instructions to a display to cause the display to present the user interface.

24. The computer storage medium of claim 23, wherein:
receiving the confidence score that indicates a likelihood that the object is of a the object sub-type comprises receiving, for at least some of the objects in the plurality of objects, multiple corresponding confidence scores each of which indicates a likelihood that the object is of an object sub-type for which the deep neural network is trained; and
determining, for at least some of the objects using the corresponding confidence scores, whether to use a disambiguation deep neural network, different from the deep neural network, to determine an object sub-type label for the object comprises determining, for at least some of the objects, whether two of the corresponding confidence scores each satisfy a threshold confidence score.

25. The computer storage medium of claim 24, the operations comprising determining to use the disambiguation deep neural network for an object from the plurality of objects when two of the corresponding confidence scores for the object each satisfy the threshold confidence score.

26. The computer storage medium of claim 23, wherein:
receiving the confidence score that indicates a likelihood that the object is of a corresponding object sub-type comprises receiving, for at least some of the objects in the plurality of objects, multiple corresponding confidence scores each of which indicates a likelihood that the object is of an object sub-type for which the deep neural network is trained; and
determining, for at least some of the objects using the corresponding confidence scores, whether to use a disambiguation deep neural network, different from the deep neural network, to determine an object sub-type label for the object comprises determining, for at least some of the objects, whether two of the corresponding confidence scores are within a threshold distance from each other.

27. The computer storage medium of claim 26, the operations comprising determining to use the disambiguation deep neural network for an object from the plurality of objects when two of the corresponding confidence scores for the object are within a threshold distance from each other.

28. The computer storage medium of claim 23, wherein:
generating the instructions for presentation of the user interface comprises:
determining that at least one of the confidence scores does not satisfy a threshold confidence score;
determining that a current processing time exceeds a threshold processing time; and
in response to determining that a current processing time exceeds a threshold processing time, determining to generate the instructions for presentation of the user interface that identifies, for each of the plurality of objects, the sub-type label for the respective object sub-type at a location in the user interface that corresponds with the likely position of the object in the image despite determining that at least one of the confidence scores does not satisfy a threshold confidence score.

29. The computer storage medium of claim 23, the operations comprising:
determining a stock of one or more objects from the plurality of objects using one or more object sub-type labels, the object location data, or both; and
determining, using the stock of the one or more objects, a quantity of objects to request for delivery to a physical location that includes an area depicted in the image.

* * * * *

UNITED STATES PATENT AND TRADEMARK OFFICE
CERTIFICATE OF CORRECTION

PATENT NO. : 10,210,432 B2
APPLICATION NO. : 16/007629
DATED : February 19, 2019
INVENTOR(S) : Andrea Pisoni Page 1 of 1

It is certified that error appears in the above-identified patent and that said Letters Patent is hereby corrected as shown below:

In the Claims

Column 36, Line 31, in Claim 17, delete "a the" and insert -- the --.

Column 37, Line 56, in Claim 24, delete "a the" and insert -- the --.

Signed and Sealed this
Thirtieth Day of April, 2019

Andrei Iancu
*Director of the United States Patent and Trademark Office*